(12) United States Patent
Varma

(10) Patent No.: US 10,055,779 B1
(45) Date of Patent: Aug. 21, 2018

(54) INTERACTING WITH A PERSISTENT VIRTUAL SHOPPING CART

(71) Applicant: Square, Inc., San Francisco, CA (US)

(72) Inventor: Ajit Kalidindi Varma, San Francisco, CA (US)

(73) Assignee: SQUARE, INC., San Francisco, CA (US)

( * ) Notice: Subject to any disclaimer, the term of this patent is extended or adjusted under 35 U.S.C. 154(b) by 761 days.

(21) Appl. No.: 14/501,285

(22) Filed: Sep. 30, 2014

(51) Int. Cl.
*G06Q 30/00* (2012.01)
*G06Q 30/06* (2012.01)
*G06Q 20/40* (2012.01)

(52) U.S. Cl.
CPC ....... *G06Q 30/0633* (2013.01); *G06Q 20/401* (2013.01); *G06Q 30/0641* (2013.01)

(58) Field of Classification Search
CPC .......................................... G06Q 30/06–30/08
USPC ............................................. 705/26.1–27.2
See application file for complete search history.

(56) References Cited

U.S. PATENT DOCUMENTS

| | | | | |
|---|---|---|---|---|
| 8,266,014 B1 * | 9/2012 | Bhosle | ............... | G06Q 30/0278 705/26.7 |
| 2001/0042024 A1 | 11/2001 | Rogers | | |
| 2007/0185785 A1 | 8/2007 | Carlson et al. | | |
| 2008/0046331 A1 * | 2/2008 | Rand | ...................... | G06Q 30/00 705/26.81 |
| 2013/0198032 A1 | 8/2013 | Wallace et al. | | |
| 2013/0275237 A1 | 10/2013 | Ramaratnam et al. | | |
| 2014/0201367 A1 * | 7/2014 | Trummer | ............... | G06F 3/0484 709/225 |
| 2015/0066799 A1 * | 3/2015 | Scipioni | ............... | G06Q 10/083 705/337 |
| 2016/0019628 A1 | 1/2016 | Udumudi et al. | | |

OTHER PUBLICATIONS

"CDS Assists Polk Audio in Going Direct-to-Consumer with I-Sonic Entertainment System" (Business Wire, Sep. 6, 2006) https://dialog.proguest.com/professional/docview/670582556?accountid=142257 (Year: 2006).*
Non-Final Office Action dated Apr. 10, 2017, for U.S. Appl. No. 14/501,332, of Varma, A.K., filed Sep. 30, 2014.
Final Office Action dated Nov. 15, 2017, for U.S. Appl. No. 14/501,332, of Varma, A.K. filed Sep. 30, 2014.
Advisory Action dated Feb. 2, 2018, for U.S. Appl. No. 14/501,332, of Varma, A.K., filed Sep. 30, 2014.

* cited by examiner

*Primary Examiner* — Ethan D Civan
(74) *Attorney, Agent, or Firm* — Polsinelli PC—Square

(57) ABSTRACT

In some examples, a buyer device is configured to present a first graphic user interface (GUI) including information about items available from a first merchant site. The first GUI may further include a virtual control for adding a selected item to a persistent virtual cart maintained by a service provider. The buyer device may be navigated to a second merchant site to present a second GUI that may receive a selection to cause a second item from the second merchant site to be added to the persistent virtual cart. The buyer device may present a cart GUI for accessing the persistent virtual cart. The cart GUI may be used to send an instruction for ordering the items associated with the cart, causing the service provider to send an order for the first item to the first merchant and an order for the second item to the second merchant.

19 Claims, 12 Drawing Sheets

US 10,055,779 B1

INTERACTING WITH A PERSISTENT VIRTUAL SHOPPING CART

BACKGROUND

When a consumer shops online, the consumer may place a virtual item into a virtual shopping cart to represent an intent to purchase a real item corresponding to the virtual item. However, as the consumer navigates from a first website to a second website, the consumer typically starts out with a new, empty cart that does not include any items added to the cart at the first website. Thus, a consumer conventionally has to check out and provide payment at each website at which the consumer chooses to purchase an item.

BRIEF DESCRIPTION OF THE DRAWINGS

The detailed description is set forth with reference to the accompanying figures. In the figures, the left-most digit(s) of a reference number identifies the figure in which the reference number first appears. The use of the same reference numbers in different figures indicates similar or identical items or features.

DETAILED DESCRIPTION

Figure 1:
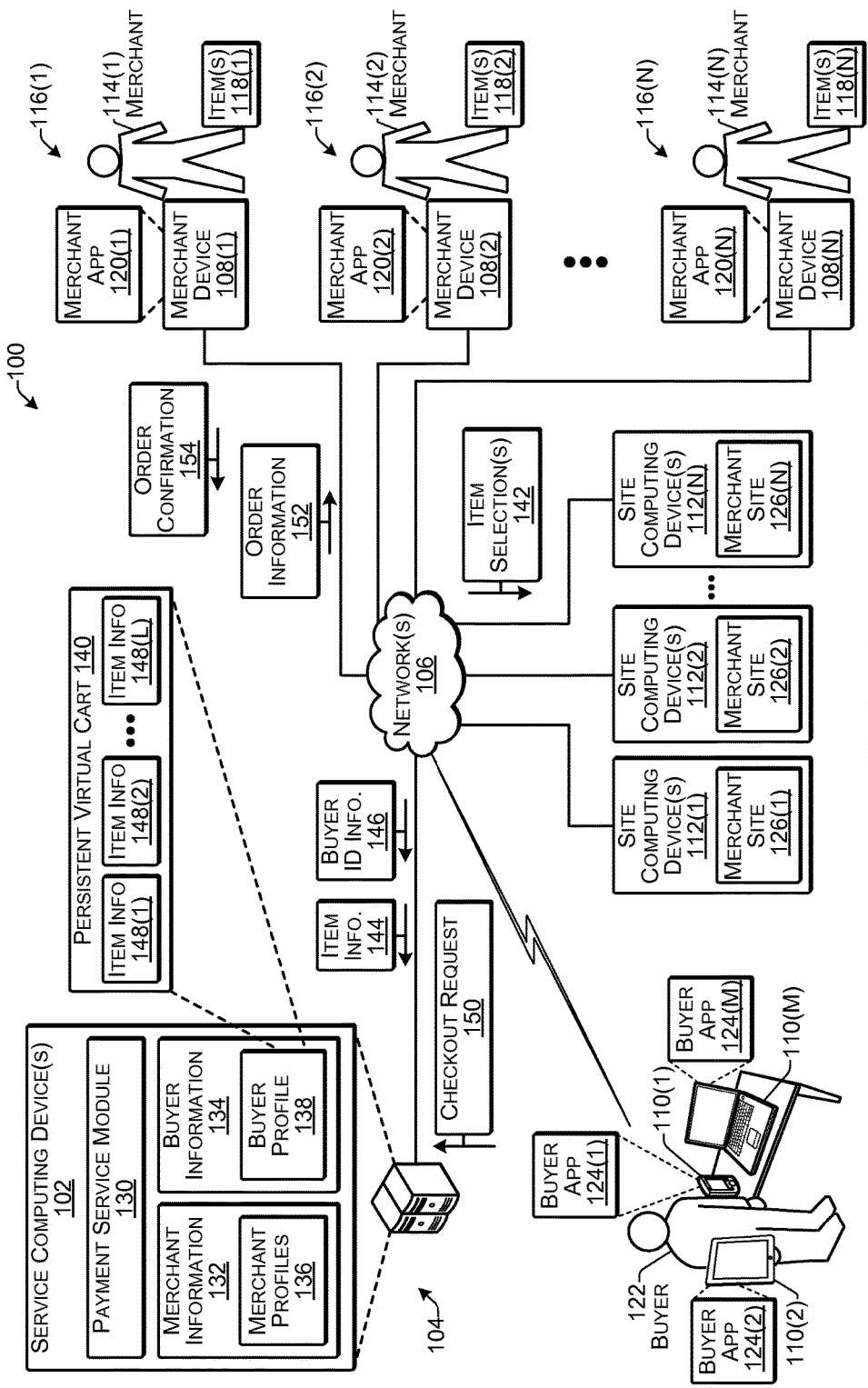
FIG. 1 illustrates an example environment for a persistent virtual cart and payment service according to some implementations.

Some implementations described herein include techniques and arrangements for enabling a persistent virtual cart to persist across multiple sites of a plurality of different respective merchants. For example, when a buyer accesses a website, ecommerce site, online site, or other site of a merchant that participates in the payment service herein, the buyer may select an item from the merchant site. The selected item can be added to a persistent virtual cart maintained by the service provider that provides the payment service. The buyer may go on to a different site of a different merchant and select an item from that merchant site. That item may also be added to the persistent virtual cart. The buyer may pay for both items as a single transaction using the payment service, and may either pick up the items at the physical locations of the respective merchants, have the merchants deliver the respective items to the location of the buyer, or the like.

Conventionally, if a buyer desires to purchase multiple items from multiple different merchants, the buyer may typically have to select each desired item at the respective merchant site that offers that item, check out or otherwise pay at that merchant site and then move on to the next merchant site of a different merchant to acquire the next desired item. On the other hand, implementations herein enable the buyer to sign in to the payment service to utilize a persistent virtual cart that may be maintained indefinitely by the service provider for the buyer.

In some examples, the buyer may use the persistent virtual cart for purchasing items from brick-and-mortar merchants near the buyer. For instance, suppose the buyer is hungry and would like a chicken sandwich and a cup of coffee. The buyer may navigate a browser or other buyer application on the buyer device to a first merchant site associated with a nearby sandwich shop. The buyer may select a first item from a menu at the first merchant site, e.g., a chicken sandwich, and add the first item to the persistent virtual cart maintained by the service provider. The buyer may then navigate the buyer application to a second merchant site associated with a nearby coffee shop, select a second item from a menu at the second merchant site, e.g., a cup of coffee, and add the second item to the persistent virtual cart. The buyer may pay for both of the items as a single transaction using the payment service, and may then pick up the items from the respective merchants, have the items delivered, have the items shipped, or the like. Alternatively, the buyer may use the persistent virtual cart to place an order for the items and may tender or finalize payment upon picking up or otherwise receiving the ordered items.

As one example, the buyer may sign in with the payment service at the first merchant site or prior to navigating to the first merchant site. For instance, each merchant site may present a button, icon, or other virtual control that is selectable by the buyer for adding items to the persistent virtual cart. Thus, the buyer may add desired items at each merchant site visited using the virtual control associated with the payment service. When the buyer desires to check out, the buyer may select a button, icon, or other type of virtual control presented with the merchant site and associated with the payment service for checking out, making a payment or otherwise placing orders for the items in the virtual cart. The virtual control may refer the buyer to a network location that allows the buyer to pay for the items in the persistent virtual cart using the payment service. Consequently, a variety of merchant sites that are otherwise unrelated to each other and that offer different types of goods or services for sale may participate in the payment service. The various different merchant sites may each present one or more virtual controls associated with the payment service that enable the user to add items from the respective merchant sites to a persistent virtual cart that persists no matter how many different merchant sites the buyer visits. At any given point, regardless of which merchant site the buyer is currently accessing, the buyer can view, edit and otherwise revise the items in the persistent virtual cart, even if the buyer is not currently accessing a particular merchant site from which a particular item was added to the persistent virtual cart.

For discussion purposes, some example implementations are described in the environment of a service provider that provides a payment service to enable a buyer to select and pay for multiple items from multiple respective different merchants using a single persistent virtual cart. However, implementations herein are not limited to the particular examples described, and may be extended to other types of items, other types of merchants, other usage environments, other system architectures, and so forth, as will be apparent to those of skill in the art in light of the disclosure herein.

FIG. 1 illustrates an example environment 100 for a persistent virtual cart and payment service according to some implementations. The environment 100 includes one or more service computing devices 102 associated with a service provider 104 to provide the persistent virtual cart and payment service. The service computing devices 102 may be able to communicate over one or more networks 106 with one or more merchant devices 108, one or more buyer devices 110, and one or more site computing devices 112. In some examples, the service provider 104 may be any business, enterprise, or other entity that offers, sells, supplies or otherwise enables the persistent virtual cart and payment service described herein.

Each merchant device 108(1), 108(2), . . . , 108(N) may be associated with a respective merchant 114(1), 114(2), . . . , 114(N), such as at a particular geographic location that serves as a point of sale (POS) location 116(1), 116(2), . . . , 116(N) for the respective merchant 114(1), 114(2), . . . , 114(N). In some examples, each merchant 114(1), 114(2), . . . , 114(N) may offer various types of goods and/or services, referred to herein as items 118(1), 118(2), . . . , 118(N), respectively. Examples herein are not limited to any particular types of items 118. The merchant devices 108(1), 108(2), . . . , 108(N) may be computing devices that each include an instance of a merchant application 120(1), 120(2), . . . , 120(N) that execute on each respective merchant device 108(1), 108(2), . . . , 108(N). In some examples, the merchant application 120 and associated hardware (e.g., card reader, barcode scanner, etc., as discussed below) may specifically configure the merchant device 108 to provide POS functionality to the merchant device 108 to enable the merchant 114 to accept payments at the POS location 116. For example, the merchant 114 may use the merchant device 108 to accept payments at the POS location 116 from one or more buyers 122 using a variety of payment instruments, such as payment cards, cash, checks, etc., in addition to the electronic payments discussed herein. In other examples, the merchant device 108 may be a computing device that is separate from a POS device at the POS location 116.

As described herein, the merchant 114 may include any business or other entity engaged in the offering of items for acquisition by the buyers 122 in exchange for compensation received from the buyers 122. Actions attributed to a merchant 114 herein may include actions performed by employees or other agents of the merchant 114 and, thus, no distinction is made between merchants and their employees unless specifically discussed. In addition, as described herein, the buyer 122 may include any entity that acquires items from a merchant 114, such as by purchasing, renting, leasing, borrowing, licensing, or the like. Buyers 122 may include customers or potential customers of a merchant 114. Thus, a merchant 114 and a buyer 122 may interact with each other to conduct a transaction in which the buyer 122 acquires one or more items 118 from the merchant 114 and, in return, the buyer 122 provides payment to the merchant 114. For instance, the buyer 122 may order and pay for the item 118 in advance, e.g., through placement of an order and making a payment using the persistent virtual cart described herein.

The buyer 122 may be associated with the one or more buyer devices 110(1), 110(2), . . . , 110(M), that each may execute a respective instance of a buyer application 124(1), 124(2), . . . , 124(M). For example, some buyers 122 may carry buyer devices 110, such as smart phones, tablet computers, wearable computing devices, or the like, as further enumerated elsewhere herein, and some of these buyer devices 110 may have installed thereon the buyer application 124. In other examples, the buyer devices 110 may be semi-stationary or stationary computing devices such as laptop computers, desktop computers, or the like. The buyer application 124 may include electronic payment capability, which enables the buyer 122 to make a payment to the merchant 114 using the buyer application 124, rather than paying with a physical payment card, cash, bill, or other payment instrument. The buyer application 124 may further enable the buyer 122 to place an order for an item 118 in addition to paying for the item 118, such as by enabling the buyer to virtually place the item into a persistent virtual cart as an indication of an intent to purchase the item.

The merchants 114(1), 114(2), . . . , 114(N) may be associated with respective merchant sites 126(1), 126(2), . . . , 126(N) maintained through the one or more respective site computing devices 112(1), 112(2), . . . , 112(N). For instance, the site computing devices 112 may be web servers, or the like, and the merchant sites 126 may include websites, ecommerce sites, online menus, webviews, or the like, which may be accessed by the buyer 122 using the buyer device 110 to enable the buyer 122 to view the items 118 offered by each merchant 114. Thus, the buyer 122 may use the buyer application 124 to select an item 118 by virtually placing the item into a persistent virtual cart. For example, virtually placing the item into a persistent virtual cart may include receiving a buyer input via a graphic user interface (GUI) presented by the buyer application to indicate that the buyer 122 has selected a particular item 118 for purchase. The respective merchant site 126 may receive this buyer input, and in response may send information to the service computing device 102 to indicate that the particular item has been selected for purchase by the buyer 122. Further, as discussed additionally below, when an order and/or purchase has been confirmed, the merchant site 126 and/or the service computing device 102 may communicate order information to the corresponding merchant application 120 on the respective merchant device 108 to provide notification of the order received from the buyer 122.

The service computing device 102 may include a payment service module 130 that may receive transaction information to enable processing of payments in conjunction with the merchant application 120 and/or the buyer application 124. For example, the payment service module 130 may receive or determine transaction information, such as an overall amount of each transaction, a description of items 118 purchased, an amount charged for each item 118, an amount charged for tax, an amount of gratuity to be added, and so forth. Thus, in some instances, the merchant device 108 may function as a POS device that can receive payments through a variety of payment instruments, including payment cards, checks and cash, as well as enabling electronic payments to be made through the buyer application 124.

The payment service module 130 may communicate with the merchant application 120 to enable the merchant device 108 to receive certain types of payments such as electronic payments or payment card payments. In the case that that a buyer 122 is using the buyer application 124 to pay electronically, in addition to ordering items, any of several techniques may be employed for making electronic payments. As one example, the buyer 122 may establish an account with the service provider 104 through the buyer application 124. For instance, the buyer 122 may link a credit card or other buyer account to the buyer application 124. Subsequently, the buyer 122 may interact with merchants 114 who participate in the payment service offered by the service provider 104, and may use the buyer application 124 to pay for items, either remotely, or in person at the POS location 116. When the buyer 122 authorizes a payment for a transaction, such as through the buyer application 124, the service computing device 102 may charge the linked buyer account and may credit a merchant account of the corresponding merchant 114.

As an alternative, when a buyer 122 uses the buyer application 124 to order an item 118, and then pays in person with a physical payment card, the payment service module 130 may receive the transaction information from the merchant device 108. For example, the received transaction information may include the transaction amount and the payment card information. The payment service module 130 may verify that the particular payment card can be used to pay for the transaction, such as by contacting a card clearinghouse computing device or other bank computing device (not shown in FIG. 1). In some examples, the payment service module 130 may redirect payment card information for transactions to an appropriate card clearinghouse computing device, while in other examples, the merchant device 108 may communicate directly with an appropriate card clearinghouse computing device for approving or denying a transaction using a particular payment card for a particular transaction.

The payment service module 130 may use and/or maintain merchant information 132 and buyer information 134. To accept payments for POS transactions, the merchant 114 typically creates a merchant profile 136 with the service provider 104 by providing information describing the merchant including, for example, a merchant name, contact information, e.g., telephone numbers, the merchant's street address, and one or more financial accounts to which funds collected from buyers will be deposited. Further, the service provider 104 may also associate with the merchant profile 136 additional information about the merchant, such as a record of each transaction conducted by the merchant. In addition, the merchant profile 136 may include item information, such as a menu or other listing of items offered by the merchant, and prices and descriptions associated with each item offered by the merchant.

Further, before conducting an electronic payment transaction, the buyer 122 may create a buyer profile 138 with the service provider 104. The buyer 122 can create the buyer profile 138, for example, by interacting with the buyer application 124. When enabling electronic payments with the service provider 104, the buyer 122 may provide data describing a financial account of the buyer 122, e.g., a credit card number, expiration date, and a billing address. Further, the buyer profile 138 may include demographic information about the buyer 122 and a record of transactions conducted by the buyer 122.

The merchant profiles 136 and/or buyer profiles 138 described herein may be created and maintained using any suitable types of data structures, and using any suitable data storage or database techniques. In some examples, the profile information may be maintained in a relational database in which pieces of information for individual buyer profiles and merchant profiles may be stored distinctly from one another, but are related to or otherwise associated with particular profiles in the relational database. For instance, a particular buyer profile 138 may be obtained by generating a view of a portion the data related in the database to the particular buyer profile, or by otherwise extracting the data from the database. Alternatively, of course, other types of storage techniques may be used for generating and maintaining the buyer profiles 138 and/or the merchant profiles 136.

A plurality of buyers 122 and a plurality of merchants 114 may participate in the payment service offered by the service provider 104. In the illustrated example, the buyer 122 may use one of the buyer devices 110 to access a first merchant site 126(1) and select, via a first GUI (not shown in FIG. 1), a first item 118(1) to purchase through the first merchant site 126(1). As mentioned above, the first merchant site 126(1) is associated with the first merchant 114(1) and a first merchant profile maintained by the payment service. When making the selection, the buyer 122 may choose to add the first item 118(1) to a persistent virtual cart 140 that is associated with the buyer profile 138 of the particular buyer 122. For instance, the first merchant site 126(1) may be presented in a GUI that includes a selectable button, icon or other type of virtual control (not shown in FIG. 1) for virtually adding the selected item to the persistent virtual cart 140 that is maintained by the service computing device 102. Thus, the buyer may click on, tap on, or otherwise select the virtual control presented in the GUI to add the item to the persistent virtual cart 140.

As one example, in response to the item selection 142, item information 144 and buyer identifying information 146 may be sent from the first merchant site 126(1) to the payment service module 130 at the service computing device 102. For instance, when the buyer 122 selects the virtual control to add the first item 118(1) to the persistent virtual cart 140, the buyer 122 may be prompted to enter a user ID and a password associated with the buyer profile 138 of the particular buyer 122, or other buyer identifying information 146 that identifies the particular buyer 122 associated with the particular buyer profile 138.

As another alternative, if the buyer is already signed in to the payment service, the payment service may be able to associate the buyer selection with the buyer profile 138 based on a cookie maintained on the buyer device 110, such as in the case that the buyer application 124 is a browser or includes browser-like functionality. For example, a cookie may include a small data file stored on the buyer device by the buyer's browser or other buyer application 124. The cookie can include buyer identifying information about the buyer, information about a merchant site from which a selection was made, information about the service provider, information about the persistent virtual cart, or the like.

In some examples, the cookie may be an authentication cookie that includes information, which may be encrypted, and which may correspond to authentication information that may have been previously provided by the buyer. For instance, the merchant sites may not have access to the actual buyer credential information through the cookie, or otherwise, but instead may forward an encrypted authentication cookie to the service provider as the buyer identifying information 146, along with information about an item that has been selected by the buyer at the merchant site. The service computing device 102 may receive and decrypt the authentication cookie to determine a buyer profile 138 and a corresponding persistent virtual cart 140 with which to associate the item information 144 corresponding to the item selected by the buyer 122. Of course other types of cookies may be used other than encrypted authentication cookies. Further, if an identifying cookie is not present on the buyer device 110, the buyer 122 may be presented with a login GUI, or the like, to enable the buyer 122 to provide buyer identifying information 146 which may be forwarded to the service computing device 102 and/or which may be used to generate a cookie for placement on the buyer device 110. The cookie may then be used by the next merchant site to which the buyer navigates the buyer device 110.

As another alternative, in the case that the buyer application 124 is a mobile ordering and payment application or other specialized application, the buyer application 124 may provide the buyer identifying information 146 to at least one of the merchant site 126 or the payment service module 130. As still another example, in the case that the buyer application 124 is a browser, the browser may include a browser plug-in that sends at least the buyer identifying information 146 to the service computing device 102 and, in some cases, may send the item information 144 as well. As still another alternative, the browser plug-in may provide the buyer identifying information 146 to the merchant site 126. The merchant site 126 may then include the received buyer identifying information 146 with the item information 144 sent to the service computing device 102. Based on the buyer interaction with the first merchant site 126(1), item information 148(1) related to the first item is added to the persistent virtual cart 140 associated with the buyer profile 138 of the particular buyer 122. Additionally, in some examples, the item information 148(1) may be associated with the merchant profile 136 corresponding to the first merchant 114(1).

Subsequently, the buyer 122 may navigate to a second merchant site 126(2) associated with the second merchant 114(2) that is different from the first merchant 114(1). The buyer may select a second item 118(2) through an item selection 142 in a manner similar to that discussed above. For example, the buyer 122 may select a virtual control presented in a second GUI with the second merchant site 126(2), which results in item information 144 related to the second item 118(2) and buyer identifying information 146 being sent to the payment service module 130 at the service computing device 102. Since the buyer 122 has already signed in to the payment service, it may not be necessary for the buyer to sign in again. The payment service module 130 may receive the item information 144 corresponding to the buyer selection of the second item, and add second item information 148(2) to the persistent virtual cart 140 associated with the buyer profile 138. The process may be repeated by the buyer, e.g., such that the persistent virtual cart 140 may include item information 148(1), 148(2), . . . , 148(L), for a plurality of items for which the buyer 122 has expressed an intent to purchase.

When the buyer 122 has finished adding items to the persistent virtual cart 140, the buyer 122 may select a virtual control at one of the merchant sites 126 or, alternatively, in a cart GUI including cart information received from the service computing device 102, to check out or otherwise order and/or pay for the selected items. In some cases, the buyer 122 may use the persistent virtual cart 140 to order the items in the cart, and may pay for the items in person at the POS locations 116 associated with each of the respective merchants 114 from which an item has been ordered. In other examples, the buyer 122 may use the checkout process to both order and pay for the items in the persistent virtual cart 140. Accordingly, the buyer 122 may send a checkout request 150 to the payment service module 130 to notify the payment service module that the buyer is ready to order the items associated with the persistent virtual cart 140.

In some examples, during checkout, the buyer application 124 may present cart information, including the cart contents and pricing information, on a display of the buyer device 110, such as in a cart GUI (not shown in FIG. 1) presented on the display. For instance, the cart GUI may include a listing of each item in the cart, a price for each item, taxes, added gratuity, if any, and a total amount owed. The buyer 122 may interact with the cart GUI to review the cart information, edit items in the cart, add or edit a gratuity, and authorize payment of the transaction amount. For instance, as discussed additionally below with respect to FIG. 3, the buyer application 124 may present a user interface that enables entry of a gratuity amount and entry of a signature or other buyer payment authorization. Further, the buyer 122 may receive a receipt or other order confirmation information, such as through email, in-app communication, or other suitable electronic communications.

In response to receiving a payment authorization or other payment instruction from the buyer device 110, the payment service module 130 may charge the payment amount to an account associated with the buyer 122, such as by charging a credit card previously linked to the buyer's electronic payment account. Furthermore, the payment service module 130 may credit an account of each of the merchants 114 by an amount based on the payment provided by the buyer 122 through the buyer application 124. As an example, the payment service may credit the account of a respective merchant for the amount of the items purchased, inclusive of any gratuity added by the buyer, delivery fees, shipping fees, and minus any taxes and/or service fees.

In addition, the payment service module 130 may send order information 152 to at least one of the respective merchant sites 126, or the respective merchant applications 120, to notify the respective merchants 114 that the particular items from the cart 140 have been ordered and paid for by the buyer. The merchant application 120 may present, on a display associated with the merchant device 108, a message that the particular buyer has ordered and paid for a particular item offered by the merchant. For instance, the payment service module 130 may send a first communication to the first merchant device 108(1) indicating that payment has been received from the particular buyer for the first item 118(1). Further, the payment service module 130 may send a second communication to the second merchant device 108(2) indicating that payment has been received from the particular buyer for the second item 118(2). The order information 152 may further indicate whether the respective items will be picked up by the buyer, whether the buyer has requested immediate delivery of the respective items to a specified location, whether the buyer has requested that the items be shipped, or the like.

Alternatively, the order information 152 may be sent to the respective merchant sites 126, and the merchant sites 126, in turn, may send the order information 152 to the respective merchant devices 108. In either event, the respective merchants 114 may receive notification that one or more particular items 118 have been ordered and, in some cases, paid for by the particular buyer 122. In response, the respective merchant devices 108 or the respective merchant sites 126 may send an order confirmation 154 to at least one of the service computing device 102 or the buyer device 110. For instance, the order confirmation 154 may indicate when the ordered items will be ready for pickup, or when the ordered items will be delivered, shipped, etc. In some cases, the order confirmation 154 may be sent to the service computing device 102, which in turn, forwards the order confirmation 154 to the buyer device 110, such as by in-application communication, email, text message, or the like. In other cases, the order confirmation may be sent directly from the merchant device 108 to the buyer device 110, such as by in-application communication, email, text message, or the like.

In addition, in response to receiving the order information 152, the respective merchants 114 may prepare the items for pickup by, or delivery to, the particular buyer 122. As one example, the buyer 122 may go to the POS locations 116 of the respective merchants 114, provide identifying information, such as an ID, an order confirmation number, or other identifier to the respective merchants, and obtain the items ordered from each of the respective merchants. As another example, the respective merchants 114 may deliver the ordered items to a location specified by the buyer during the checkout process. For instance, the delivery may be made via a home delivery service (i.e., a driver, runner, etc.) when the items have been prepared.

As another example, suppose that the buyer uses the persistent virtual cart 140 to order items from the first merchant 114(1) and the second merchant 114(2), but elects to pay for the items in person, rather than during online checkout. In this case, the buyer 122 may go to the POS locations 116 of the respective merchants, provide identifying information, and provide payment to the respective merchant, such as using a credit card, cash, check, or by providing electronic payment through the payment service. As one example, the buyer 122 may be provided the option of authorizing payment through the payment service when the buyer picks up the ordered item, rather than providing payment at time of online checkout during ordering of the item. For instance, the buyer 122 may access the payment service on the buyer device 110 when picking up the ordered item and may authorize payment at that time. In response, the payment service module 130 may send a notification to the respective merchant device 108 indicating that payment has been received and that the merchant 114 may release the ordered item to the buyer 122.

Figure 2:
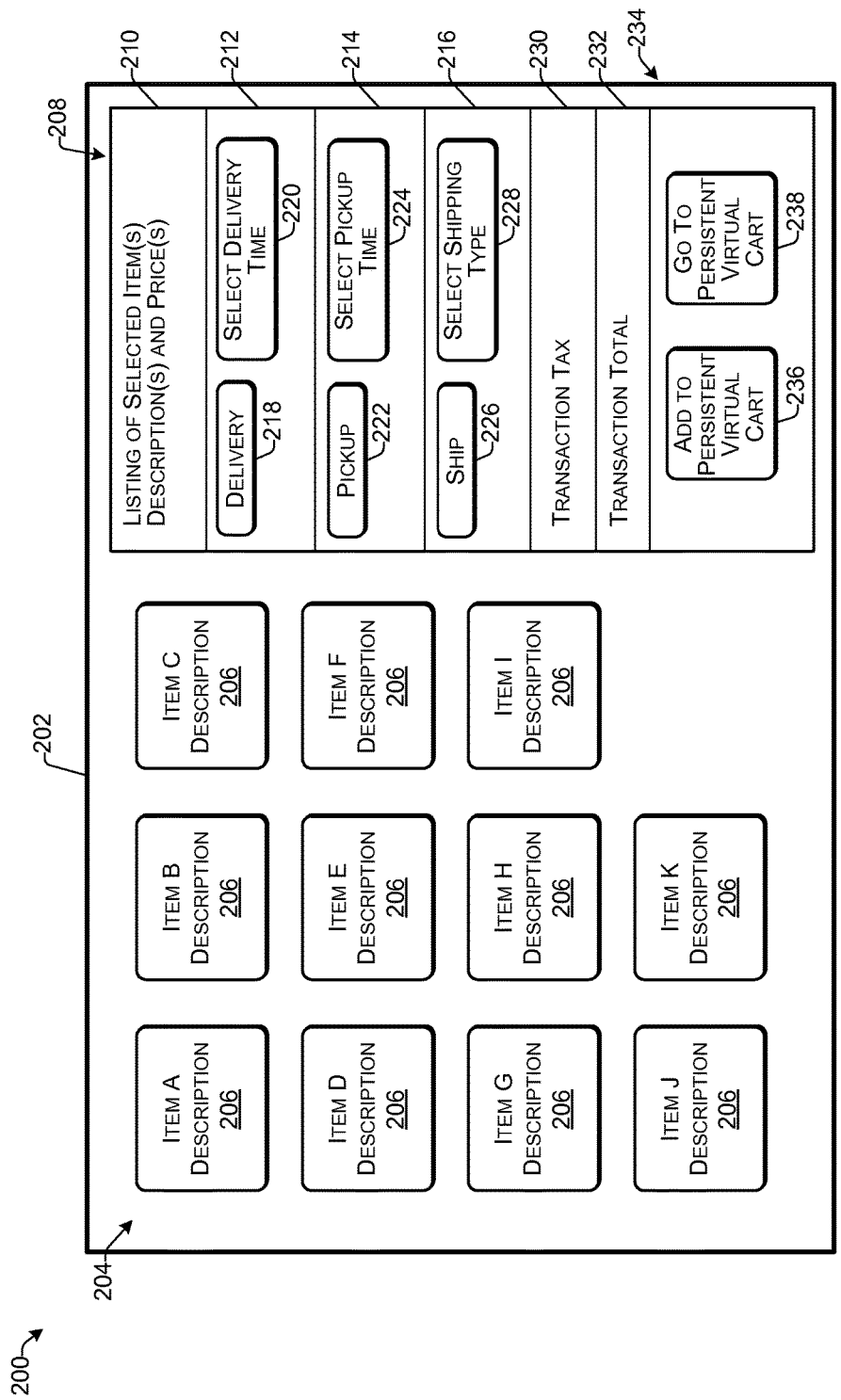
FIG. 2 illustrates an example merchant website graphic user interface (GUI) for use with a persistent virtual cart according to some implementations.

FIG. 2 illustrates an example merchant site GUI 200 for enabling a buyer to add items to a persistent virtual cart according to some implementations. The example merchant site GUI 200 may be presented on a display 202 associated with the buyer device 110. The merchant site GUI 200 and other GUIs discussed herein are illustrated for use with a touch input device and, accordingly, the display 202 may include a touch sensor (not shown in FIG. 2). However, other types of interfaces may be used with the examples herein and, accordingly, the examples herein are not limited to any particular type of interfaces or user input devices.

In the illustrated example of FIG. 2, the buyer application presents the GUI 200, such as in response to the user navigating the buyer application to the merchant site. For instance, when the buyer application is navigated to the merchant site, the buyer application may receive site information (e.g., Hypertext Mark Language (HTML) formatted information, JAVASCRIPT® code, and so forth) from the merchant site to enable the buyer application to present the GUI 200 on the display 202. The GUI 200 may include item information 204, which includes information about the items offered by the particular merchant. The item information 204 may include item representations, images, descriptions, prices, and so forth, of a plurality of items (i.e., items A-K) offered by the merchant, such as in the form of selectable icons, links, or other types of graphic elements 206. In this example, the user may select a particular item for purchase, such as by tapping or otherwise selecting the graphic element 206 that represents the particular item.

Selection of an item graphic element 206 may result in a description and price of the item being added to a transaction summary area 208 of the GUI 200. In some examples, the transaction summary area 208 may be presented in a separate window or separate screen from the item descriptions, while in other examples, as illustrated in FIG. 2, the transaction summary area 208 may be presented adjacent to one or more of the item descriptions.

The transaction summary area 208 in this example includes a selected-item description area 210 that includes a listing and/or description of selected items and corresponding prices for each selected item. Further, depending on the type of items offered by the merchant, the transaction summary area 208 may include selectable options for providing the selected items to the buyer. Thus in this example, the buyer may select an option 212 to have the item delivered by the merchant, an option 214 to pick up the item from the merchant, or an option 216 to have the merchant ship the item to the buyer. For instance, in the case that the merchant is a local restaurant, or similar business, the shipping option 216 may generally not be included in the GUI 200, and the buyer may have the option of picking up the selected item and/or having the selected item delivered to the buyer's location. On the other hand, for other types of merchants, such as those that provide goods other than food items, ecommerce merchants, etc., shipping may be a primary technique for providing an ordered item to a buyer.

To enable the buyer to select the merchant delivery option 212, the GUI 200 includes a first selectable virtual control 218 for delivery and may further include a second selectable virtual control 220 for specifying a time for delivery. For instance, a default delivery time may be to send the item out for local delivery to the location of the buyer right away, e.g., as soon as the item is prepared, while selection of virtual control 220 may enable the buyer to specify delivery at a time later in the day, later in the week, etc. In some examples, when the delivery option 212 is selected, a delivery fee, if applicable, may be shown in the transaction summary area 208.

Additionally, the GUI 200 includes a third selectable virtual control 222 to enable the buyer to select the pickup option 214, and a fourth selectable virtual control 224 to enable the buyer to specify a time at which the buyer will pick up the item from the merchant. Furthermore, in the case that the item is a type of item that the buyer would like to have shipped to the buyer, the GUI 200 includes a fifth virtual control 226 to enable the buyer to select the shipping option 216, and a sixth virtual control 228 to enable the buyer to select a shipping type, or the like. In some examples, when the buyer selects the shipping option 216, shipping charges are shown in the transaction summary area 208. In addition, the transaction summary area 208 may include a transaction tax entry 230 that this an amount of tax that will be charged for the purchase of the items, and a transaction total entry 232 that provides the total amount that will be charged for the transaction.

The GUI 200 further includes one or more additional virtual controls 234 to enable the buyer to add the selected item(s) to the persistent virtual cart discussed above with respect to FIG. 1, and/or otherwise interact with the persistent virtual cart. In this example, the virtual controls 234 include a first persistent cart virtual control 236 that is selectable by the buyer to add the selected item(s) to the persistent virtual cart associated with the buyer, a second persistent cart virtual control 238 that is selectable by the buyer to go to a cart GUI to view information about any items currently contained in the persistent virtual cart and/or check out the persistent virtual cart, e.g., for submitting an order for the items in the persistent virtual cart and/or providing payment for the items in the persistent virtual cart.

As an example, selection of the virtual control 236 or 238 may cause execution of executable code, such as JAVASCRIPT® or other active content associated with the merchant site. In response to selection of the virtual control 236, the executable code may communicate information related to the selected item(s) to the payment service module 130 on the service computing device 102 discussed above with respect to FIG. 1. Further, if the buyer has not already logged in to the payment service, selection of one of the virtual controls 234 may cause a login window (not shown in FIG. 2), or the like, to be presented, such as overlying the GUI 200. After the buyer has logged in, the buyer identifying information may also be sent to the payment service module 130 so the payment service module 130 can associate the item information from the merchant site with a persistent virtual cart associated with the particular buyer based on the buyer identifying information. In some examples, the buyer identifying information is sent by the buyer application, while in other examples, the buyer identifying information is sent by the merchant site. As another example, in the case that the buyer has previously logged in prior to selecting one of the virtual controls 234, a cookie or other stored login information may provide the buyer identifying information to the merchant site and/or to the payment service module 130 so that the buyer does not have to log in again.

Additionally, selection of the virtual control 238 may cause the buyer application to navigate to a network location associated with the persistent virtual cart. For example, the service computing device 102 may maintain the persistent virtual cart in association with a URL (uniform resource locator) or other network location at which the persistent virtual cart may be accessed by the particular buyer using the buyer application. Further, in response to the navigation to the network location associated with the persistent virtual cart, the buyer application may receive information related to the current contents of the persistent virtual cart and may present this information in a cart GUI as discussed additionally below with respect to FIG. 3.

Figure 3:
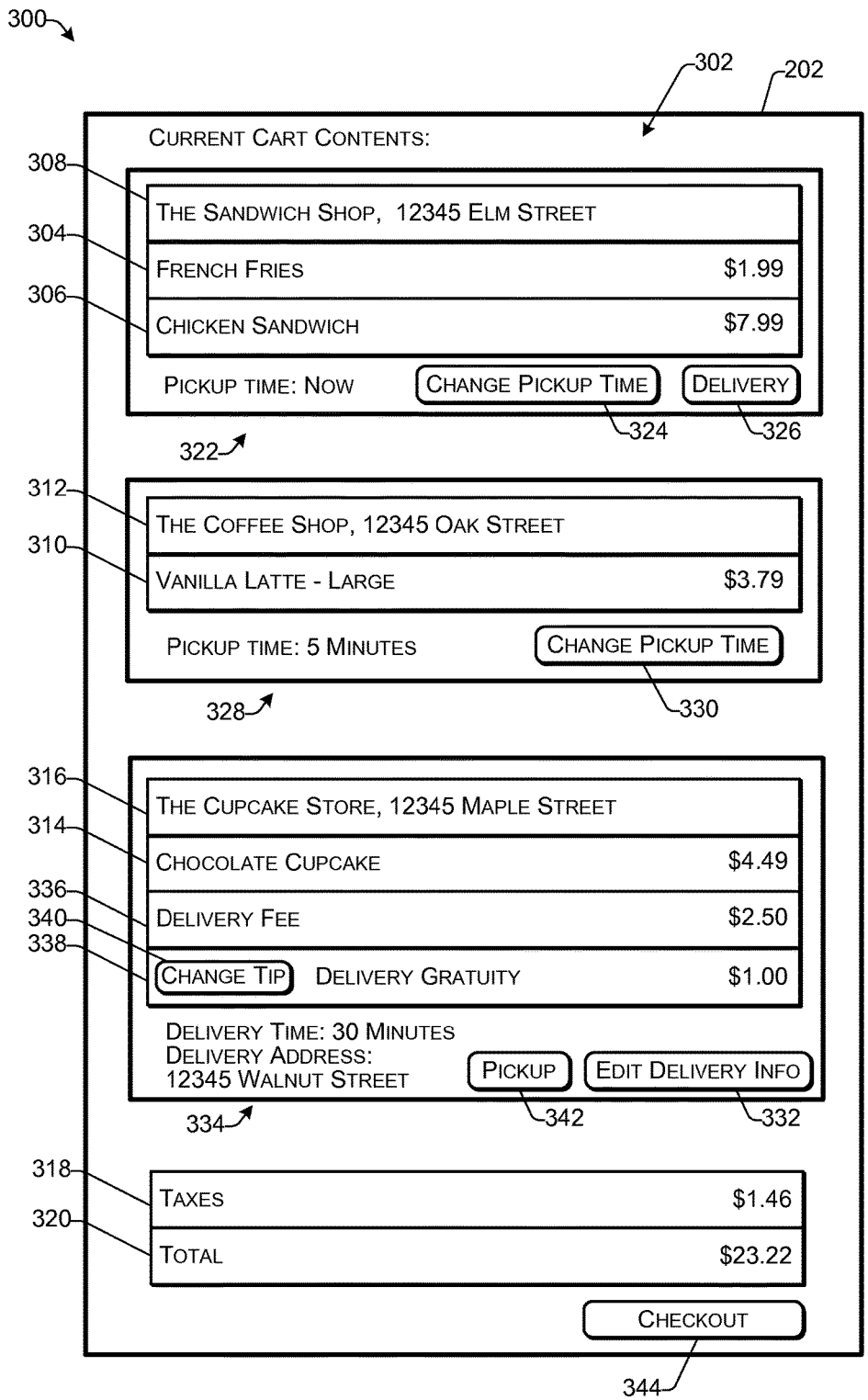
FIG. 3 illustrates an example cart GUI for a persistent virtual cart according to some implementations.

FIG. 3 illustrates an example cart GUI 300 that may be presented on the display 202 in response to the buyer selecting the virtual control 238 in the GUI 200 to go to the persistent virtual cart. Alternatively, the buyer may use the buyer application to access the cart GUI 300, such as by navigating to a network location associated with the persistent virtual cart, or by selecting a virtual control provided in the buyer application in some examples. In the illustrated example, the cart GUI 300 includes a listing 302 of the current contents of the persistent virtual cart. For instance, the listing 302 may include a description of each item in the virtual cart, the merchant from which the item is to be ordered, and a price associated with each item.

As an example, suppose that the buyer desires something to eat and has decided that she would like to have a chicken sandwich and French fries from a nearby restaurant, known as "The Sandwich Shop." Further, suppose that the buyer would like to have a vanilla latte from a nearby coffee shop, known as "The Coffee Shop," and a cupcake for desert from a nearby cupcake store known as "The Cupcake Store." Accordingly, as discussed above with respect to FIGS. 1 and 2, the buyer may navigate the buyer application to a merchant site associated with The Sandwich Shop, and may select an order of French fries and a chicken sandwich, which she adds to the persistent virtual cart, as discussed above. Next, the buyer may navigate the buyer application to a second merchant site associated with The Coffee Shop, and may select a large vanilla latte that she adds to the persistent virtual cart. Finally, the buyer may navigate the buyer application to a third merchant site associated with The Cupcake Shop, and may select a chocolate cupcake that she adds to the persistent virtual cart, as discussed above.

When the buyer is ready to checkout, the buyer may navigate to the cart GUI 300, such as by selecting a "go to cart" virtual control at a merchant site, or by otherwise navigating the buyer application to view the contents of the virtual cart, as discussed above. According to the present example, the listing 302 of the items in the virtual cart GUI 300 includes French fries 304 and a chicken sandwich 306 from The Sandwich Shop 308 at 12345 Elm Street. The listing 302 further includes a large vanilla latte 310 from The Coffee Shop 312 at 12345 Oak Street, and a chocolate cupcake 314 from The Cupcake Store 316 at 12345 Maple Street. Additionally, the cart GUI 300 may include an indication of taxes 318 to be charged for the items in the cart and a total transaction amount 320 to be paid by the buyer if all of the items in the persistent virtual cart are purchased.

In addition, the cart GUI 300 may indicate how the buyer will acquire each of the items in the persistent virtual cart. For example, with respect to The Sandwich Shop, suppose that the buyer selected pickup as the option for acquiring the selected items. The cart GUI 300 may indicate a pickup time 322 specified by the one of the buyer or the merchant. Further, the cart GUI 300 may include a virtual control 324, which the buyer may select to change the pickup time. Further, if the buyer decides to have the items from The Sandwich Shop delivered instead, the buyer may select a delivery virtual control 326 to have the items delivered to her location.

Additionally, suppose that some merchants, such as The Coffee Shop, may provide items for pick up only. Accordingly, as indicated at 328, the buyer may have specified the vanilla latte would be picked up shortly after the French fries and chicken sandwich, e.g., 5 minutes. The cart GUI 300 may further include a virtual control 330 to enable the buyer to change the pickup time.

Further, suppose that the buyer specified that the cupcake 314 would be delivered to the buyer's address. If the buyer wants to edit delivery time or delivery address, the buyer may select an "edit delivery information" virtual control 332. Otherwise, the payment service module of the service provider may automatically fill in and provide a default delivery address 334 to The Cupcake Store, and may further include an estimated delivery time, which may be specified by the buyer, as discussed above, or by The Cupcake Store. Additionally, the cart GUI 300 may show a delivery fee 336 that will be charged for the delivery of the cupcake 314, and may further show an additional delivery gratuity 338 that the buyer may have added. Further, the cart GUI 300 may include a virtual control 340 to allow the buyer to add or change the delivery gratuity 338, if desired. Additionally, should the buyer change her mind and decide to pick up the cupcake, the buyer may select a pickup virtual control 342.

Furthermore, the cart GUI 300 may include a checkout virtual control 344 that the buyer may select when the buyer is ready to authorize or otherwise instruct the payment service to place the orders for the items 304, 306, 310 and 314, and/or when the buyer is ready to provide payment for the items. For instance, after the buyer has confirmed that the buyer desires to purchase the items in the persistent virtual cart, the buyer may select the checkout virtual control 342. In response, the buyer may be presented with another GUI (not shown in FIG. 3) to confirm authorization for the payment service to send the orders for the items to the respective merchants. In some examples, the buyer may also authorize payment at that time, such as by providing a signature electronically, or by otherwise indicating an instruction to the service provider to charge the buyer's account for the items and other charges shown in the virtual cart.

In other examples, the buyer may elect to place the orders for the items, but not pay for the items until the items are received, e.g., at a POS location of a respective merchant. For instance, the respective merchants may receive payment in person from the buyer, e.g., by payment card, cash or check, and may provide the ordered items to the buyer when payment is received at the POS location. As another example, when the buyer is picking up an item or receiving delivery of an item, the buyer may use the buyer application to confirm authorization to make payment for the item at the time of pickup. The merchant may receive the confirmation of the payment from the service provider, and in response, may release the item to the buyer. This can give the buyer an opportunity to inspect an item before paying for the item.

Figure 4:
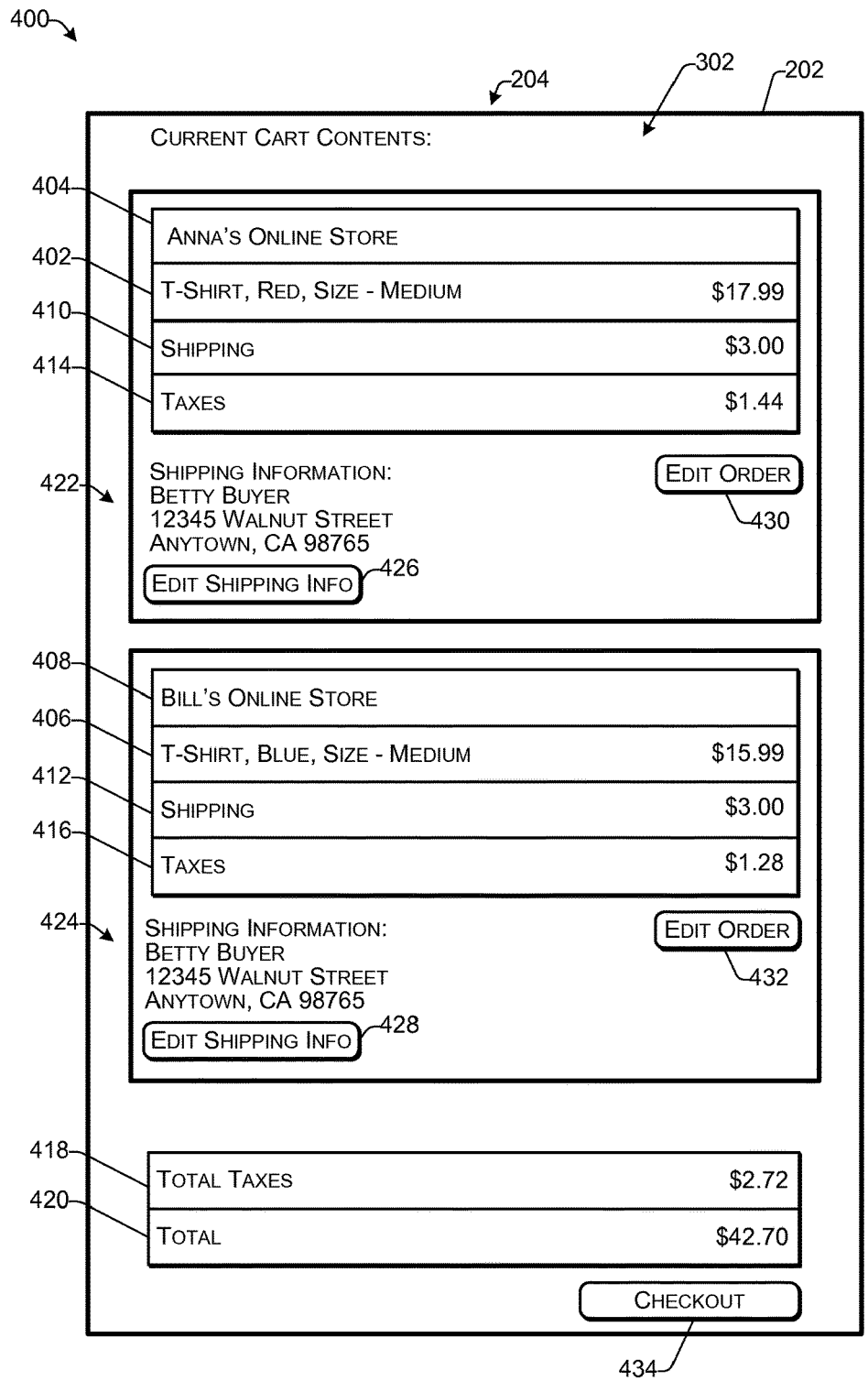
FIG. 4 illustrates an example cart GUI for a persistent virtual cart according to some implementations.

FIG. 4 illustrates an example of a cart GUI 400 that may be presented on the buyer device according to some implementations. As in the example of FIG. 3, the cart GUI 400 includes the listing 302 of the current contents of the persistent virtual cart. The listing 302 may include a description of each item in the virtual cart, the merchant from which the item is to be ordered, and a price associated with each item. In this example, suppose that the buyer is interested in purchasing items from multiple different ecommerce sites, online merchants, or other merchant sites. Further, suppose that the buyer navigated to a first merchant site known as "Anna's Online Store," selected a red T-shirt, and added the red T-shirt to the persistent virtual cart, as discussed above. Additionally, suppose that the buyer next navigated to a second merchant site known as "Bill's Online Store," selected a blue T-shirt, and added the blue T-shirt to the persistent virtual cart, as discussed above.

When the buyer is ready to checkout, the buyer may navigate to the cart GUI 400, such as by selecting a "go to cart" virtual control when accessing a merchant site, or by otherwise navigating the buyer application to view the contents of the persistent virtual cart, as discussed above. According to the present example, the listing 302 of the items in the virtual cart GUI 300 includes the red T-shirt description and price 402 from Anna's Online Store 404 and the blue T-shirt description and price 406 from Bill's Online Store 408. Further, the listing 302 may include an indication of the shipping charges 410 and 412 for the red T-shirt and the blue T-shirt, respectively, as well as an indication of the taxes 414 and 416 that will be charged for the red T-shirt and the blue T-shirt, respectively. Additionally, the cart GUI 400 may include an indication of the total taxes 418 to be charged for the items in the persistent virtual cart and a total transaction amount 420 to be paid by the buyer if all of the items in the persistent virtual cart are purchased.

Furthermore, the cart GUI 400 may indicate the respective shipping addresses 422 and 424 to which each item will be shipped. For example, the payment service module of the service provider may automatically provide a default shipping address of the buyer to the merchant sites. If the buyer would like to edit the shipping address for either order, the buyer may select a respective virtual control 426 or 428 to change the address to which the respective item will be shipped. In addition, the buyer may select a respective virtual control 430 or 432 to edit the respective order, such as for changing a quantity of the item, changing shipping type, canceling the order, adding other items to the order, or the like. As one example, selecting the virtual control 430 or 432 may cause the buyer application to navigate to the respective merchant site to enable the buyer to edit the order, such as for changing an attribute of the item, e.g., color, flavor, size, etc., or a quantity of the item. Following editing of the order, the buyer may again save the order to the persistent virtual cart. Further, if the buyer desires to cancel the order, the buyer may simply select a cancel button (not shown) without navigating to the merchant site, and the payment service module may remove the order for the particular canceled item from the virtual cart.

Furthermore, the cart GUI 400 may include a checkout virtual control 434 that the buyer may select when the buyer is ready to authorize or otherwise instruct the payment service to place the orders and provide payment for the items 402 and 406 listed in the cart GUI 400. For instance, after the buyer has confirmed that the buyer desires to purchase the items listed in the persistent virtual cart, the buyer may select the checkout virtual control 434. In response, the buyer may be presented with a GUI (not shown in FIG. 4) to confirm authorization for the payment service to send the orders for the items to the respective merchants. The buyer may also authorize payment, such as by providing a signature electronically, or by otherwise indicating an instruction to the service provider to charge the buyer's account for the items and other charges shown in the cart GUI 400.

Numerous other variations will be apparent to those of skill in the art having the benefit of the disclosure herein. For instance, while the examples of FIGS. 3 and 4 are described separately, the example items in these figures may all be added to the persistent virtual cart concurrently, and a single check out procedure may be performed for a persistent virtual cart that includes both the items 304, 306, 310, and 314 of FIG. 3 and the items 402 and 406 of FIG. 4.

Further, the persistent virtual cart may persist for an indefinite time duration in some cases. For example, the buyer may add several items to the cart one day, may add several more items the following week, edit the items already in the cart the following week, and so forth. The buyer may check out at that time or later, depending on the nature of the items in the cart, continued availability of the items, and so forth. Additionally, in some cases, the buyer may check out only some of the items in the cart, while retaining other items in the cart for checking out at a later time.

Figure 5:
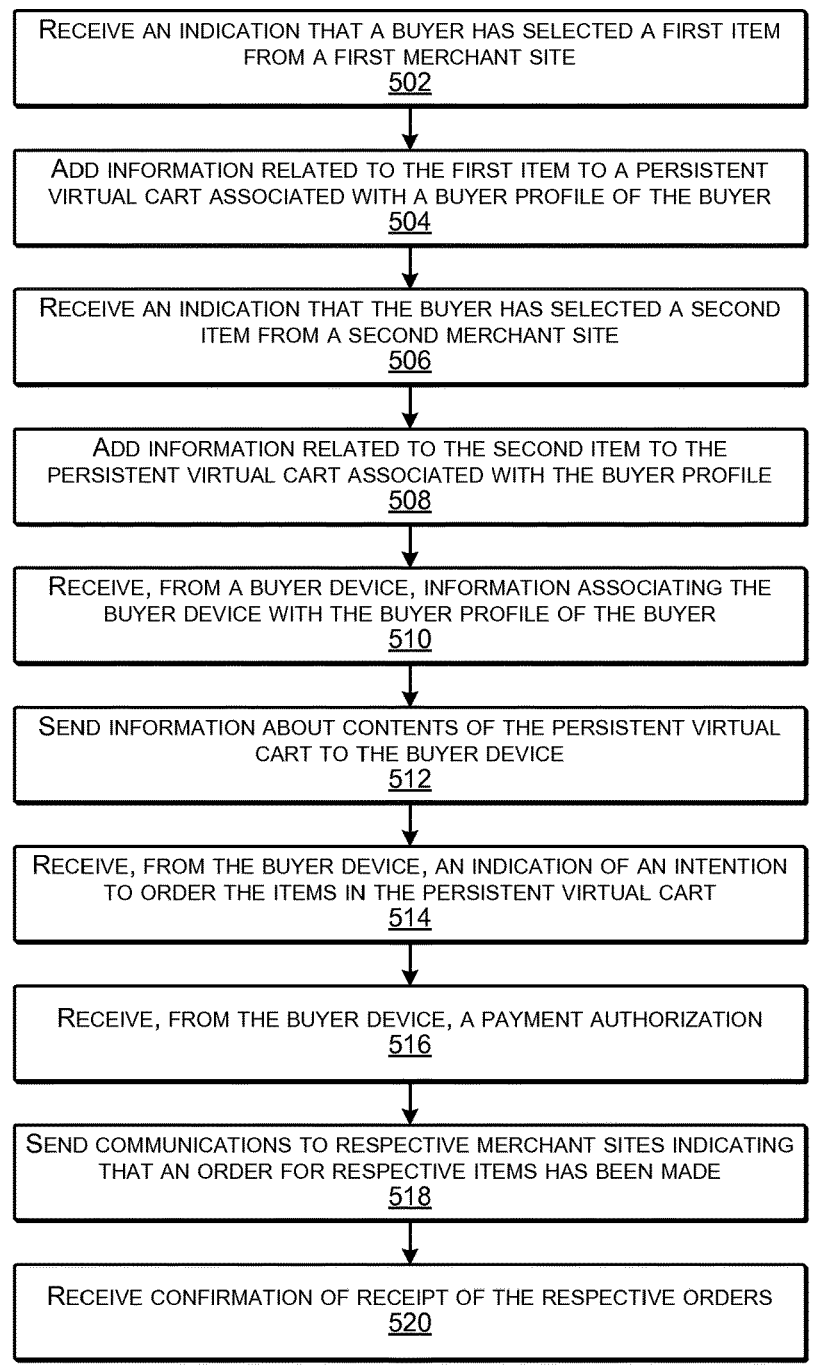
FIG. 5 is a block diagram illustrating an example process for providing a persistent virtual cart according to some implementations.
Figure 6:
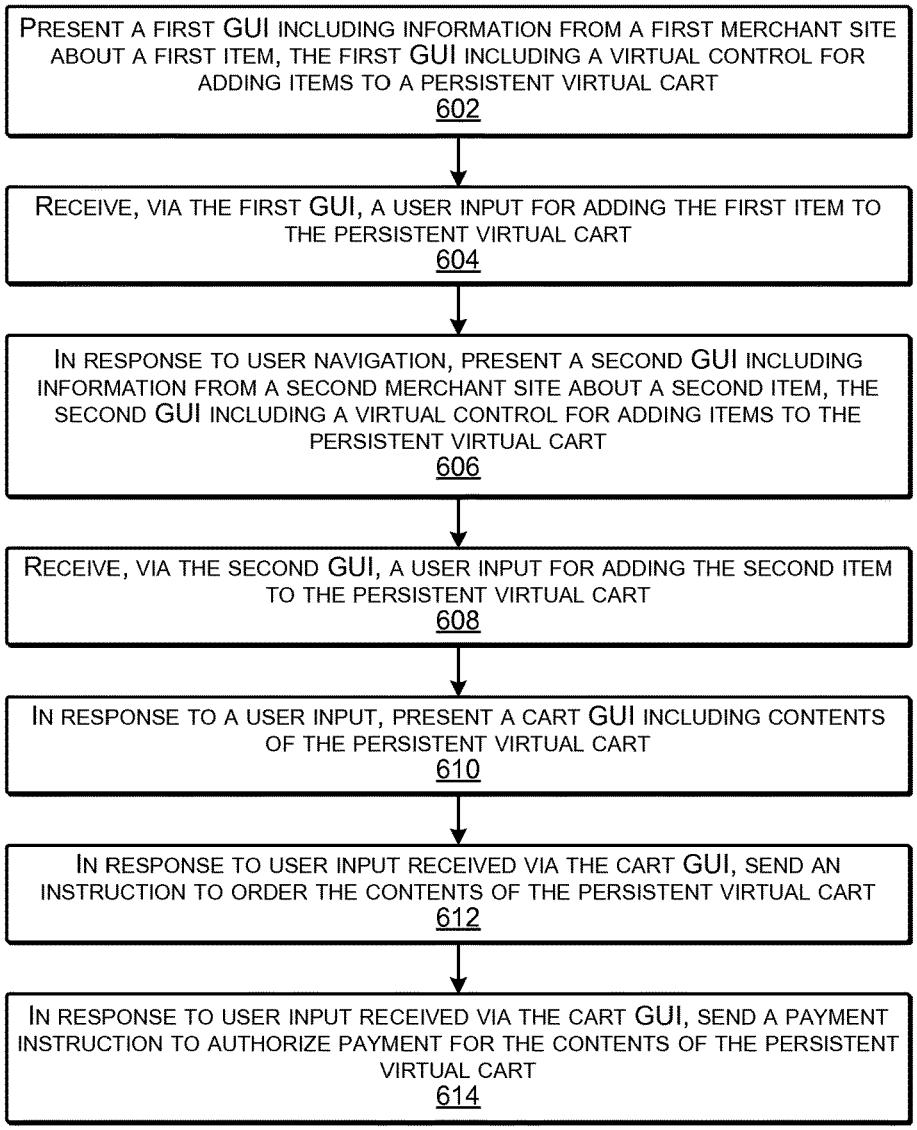
FIG. 6 is a block diagram illustrating an example process for a buyer device to interact with a persistent virtual cart via one or more GUIs according to some implementations.
Figure 7:
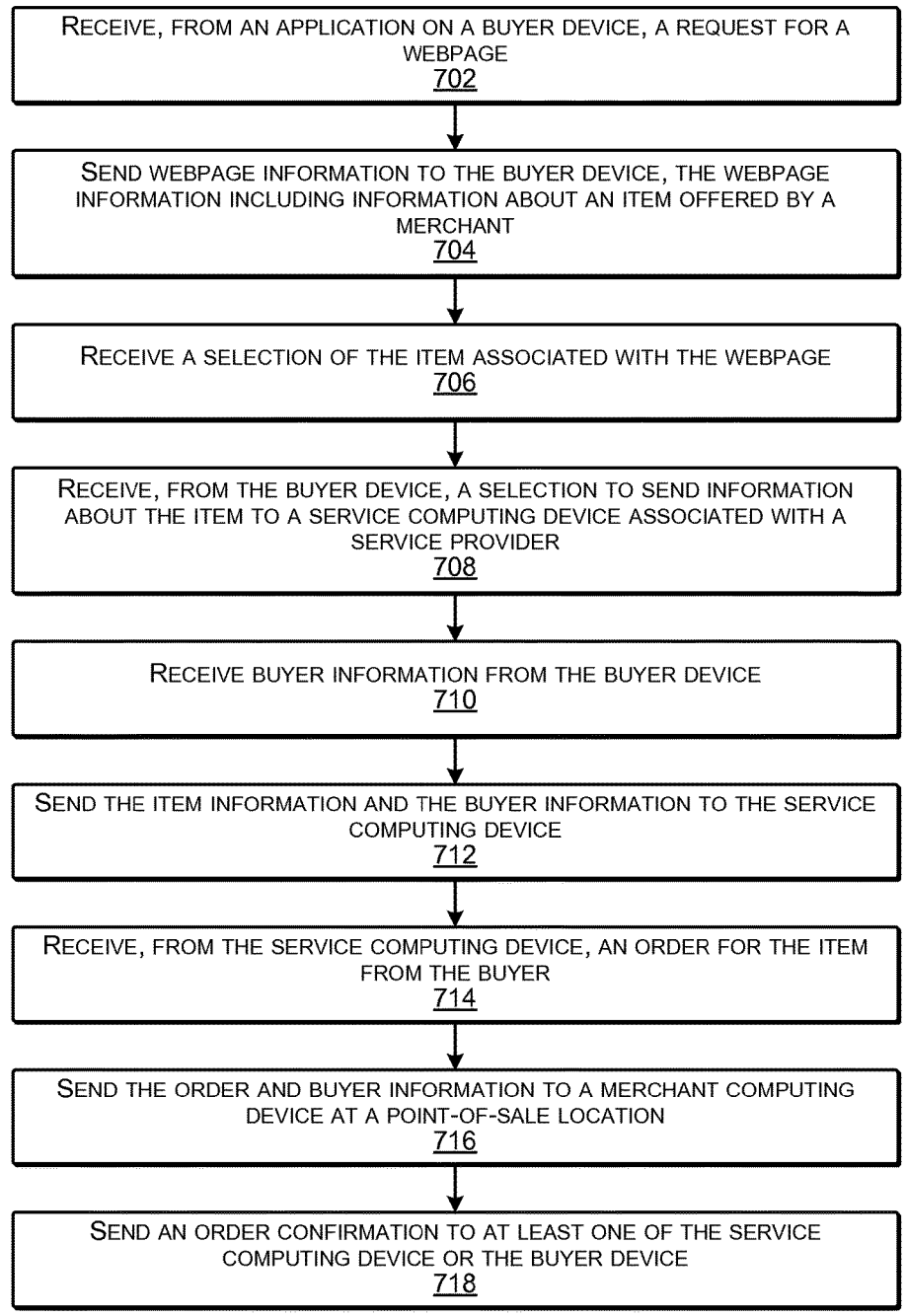
FIG. 7 is a block diagram illustrating an example process for a merchant site to interact with a persistent virtual cart according to some implementations.

FIGS. 5-7 are flow diagrams illustrating example processes for providing and interacting with a persistent virtual cart according to some implementations. The processes of FIGS. 5-7 are illustrated as collections of blocks in logical flow diagrams, which represent a sequence of operations, some or all of which can be implemented in hardware, software or a combination thereof. In the context of software, the blocks may represent computer-executable instructions stored on one or more computer-readable media that, when executed by one or more processors, program the processors to perform the recited operations. Generally, computer-executable instructions include routines, programs, objects, components, data structures, and the like, that perform particular functions or implement particular data types. The order in which the blocks are described should not be construed as a limitation. Any number of the described blocks can be combined in any order and/or in parallel to implement the processes, or alternative processes, and not all of the blocks need be executed. For discussion purposes, the processes are described with reference to the environments, architectures and systems described in the examples herein, although the processes may be implemented in a wide variety of other environments, architectures and systems.

FIG. 5 illustrates an example process 500 for enabling a persistent virtual cart to be provided according to some implementations. In some examples, the process 500 may be executed by one or more processors of the service computing device 102 associated with the service provider 104, or by one or more other suitable computing devices.

At 502, the computing device may receive an indication that a buyer has selected a first item from a first merchant site. For example, a service computing device associated with the service provider may receive from a website hosting computing device an electronic communication including information about an item selected by buyer at the first merchant site. Additionally, or alternatively, the service computing device may receive the information about the selected item from a buyer computing device, such as in the case that a browser plug-in on the buyer device is configured to send the information about the selected item to the service computing device.

At 504, the computing device may add information related to the first item to a persistent virtual cart associated with a buyer profile of the buyer. For example, the service computing device may receive an indication of the buyer profile with the information about the selected first item. As one example, information from a cookie may be provided with the information about the selected item. The cookie may provide buyer identifying information. Alternatively, the buyer identifying information may be provided using other techniques, as discussed above.

At 506, the computing device may receive an indication that the buyer has selected a second item from a second merchant site. For example, the service computing device may receive information about the second item from at least one of the site computing device that hosts the second merchant site, or from the buyer device, as discussed above.

At 508, the computing device may add information related to the second item to the persistent virtual cart associated with the buyer profile. For example, the service computing device may receive an indication of the buyer profile with the information about the second item.

At 510, the computing device may receive, from the buyer device, information associating the buyer device with the buyer profile associated with the buyer. For instance, the buyer may use the buyer device to login to the buyer profile and/or the persistent virtual cart maintained by the service computing device. In some examples, such as in the case that the buyer device includes an application that is preconfigured to access the persistent virtual cart, the buyer may be able to access automatically the persistent virtual cart, such as by selecting a virtual control or the like presented in a GUI.

At 512, the computing device may send information about contents of the persistent virtual cart to the buyer device. For example, the service computing device may send information to enable the buyer device to present a cart GUI. The cart GUI may present information about one or more items that the buyer has associated with the persistent virtual cart.

At 514, the computing device may receive, from the buyer device, an indication of intention to order the items in the persistent virtual cart. For example, the buyer may select a checkout virtual control or other suitable virtual control presented in the cart GUI. In response to the selection, the buyer device may send an instruction to the service computing device to cause the service computing device to place an order for the items and/or request payment from the buyer.

At 516, the computing device may receive, from the buyer device, a payment authorization. As one example, the buyer may select a purchase button or other virtual control in the cart GUI to indicate that the buyer has authorized the service provider to charge an account associated with the buyer profile for the purchase of the items associated with the persistent virtual cart.

At 518, the computing device may send communications to respective merchant sites indicating that an order for respective items has been made. For example, the service computing device may send a communication to the first merchant site to inform the first merchant site that the buyer has placed an order for the first item. Similarly, the service computing device may send a communication to the second merchant site to inform the second merchant site that the buyer has placed an order for the second item. Additionally, or alternatively, the communications may be sent to respective merchant devices at the respective point-of-sale (POS) locations. For example, the order for the first item may be sent to a first merchant device at a first POS location associated with the first merchant, and the order for the second item may be sent to a second merchant device at a second POS location associated with the second merchant.

At 520, the computing device may receive confirmation of receipt of the respective orders. As one example, the first merchant site may send a confirmation of the order for the first item to the service computing device and the second merchant site may send a confirmation of the order for the second item to the service computing device. As another example, the first merchant device at the first merchant POS location may send the confirmation regarding the order for the first item, and the second merchant device at the second merchant POS location may send the confirmation regarding the order for the second item. In some examples, the order confirmations may be sent directly to contact information associated with the buyer profile.

FIG. 6 is a flow diagram illustrating an example process 600 for using a persistent virtual cart according to some implementations. In some examples, the process may be executed by the buyer device, or by one or more other suitable computing devices.

At 602, the computing device may present a first GUI that includes information from a first merchant site about a first item. Furthermore, the first GUI may include a first virtual control that is selectable for adding items to a persistent virtual cart.

At 604, the computing device may receive, via the first GUI, a user input for adding the first item to the persistent virtual cart. For example, the user may select the first virtual control in the first GUI for adding the first item to the persistent virtual cart. In some cases, the selection may cause a communication to be sent to the first merchant site, and the first merchant site may in turn send information about the first item to the service computing device associated with the service provider. In other cases, the selection of the first virtual control may cause the buyer device to send the information about the first item directly to the service computing device.

At 606, the computing device may, in response to user navigation, present a second GUI including information from a second merchant site about a second item. For instance, the second GUI may include a second virtual control to enable the buyer to add items to the persistent virtual cart.

At 608, the computing device may receive, via the second GUI, a user input for adding the second item to the persistent virtual cart. For instance, the buyer may select the second virtual control presented in the second GUI for adding the second item to the persistent virtual cart.

At 610, the computing device may, in response to a user input, present a third GUI that includes contents of the persistent virtual cart. For example, the buyer device may present a cart GUI that represents the items contained in the cart as well as additional information such as item pickup times, delivery times, taxes to be charged for the items, delivery fees associated with delivering the items, delivery gratuity, shipping fees, and so forth.

At 612, the computing device may, in response to a user input received via the cart GUI, send an instruction to order the contents of the persistent virtual cart. For example, the buyer device may send an instruction to the service computing device instructing the service computing device to send the orders for the contents of the persistent virtual cart to the respective merchants.

At 614, the computing device may, in response to a user input received via the cart GUI, send a payment instruction to authorize payment for the contents of the persistent virtual cart. For example, the buyer may select a button or other virtual control presented in the cart GUI to authorize payment for the items contained in the persistent virtual cart. Thus, the service computing device may charge an account associated with the buyer profile for the total amount shown in the cart GUI for the contents of the persistent virtual cart FIG. 7 is a flow diagram illustrating an example process 700 for enabling a persistent virtual cart according to some implementations. In some examples, the process may be executed by a site computing device hosting a merchant site, or by one or more other suitable computing devices.

At 702, the computing device may receive, from an application on a buyer device, a request for a webpage. For example, a merchant website may receive a request for a particular page of the merchant website associated with a particular item offered by the merchant.

At 704, the computing device may send webpage information to the buyer device. For example, the webpage information may include information about an item offered by the merchant, e.g., in HTML format, and may further include JAVASCRIPT® code or other executable content. A browser or other application on the buyer device may receive the webpage information and may present a GUI including the webpage information.

At 706, the computing device may receive, via the GUI, a selection of the item associated with the webpage. For example, the website may receive a communication from the buyer device based on a buyer interaction with the webpage information.

At 708, the computing device may receive, from the buyer device, a selection to send information about the item to a service computing device associate with a service provider. As one example, the buyer may have selected a virtual control associated with the webpage information that instructs the merchant website to send information about the particular item to the service computing device for association with a persistent virtual cart.

At 710, the computing device may receive buyer information from the buyer device. As one example, the computing device may send information to the buyer device to cause the buyer device to present a request for buyer information, such as buyer login information associated with the persistent virtual cart and/or the buyer profile. As another example, the buyer may have already logged in with the service provider, and the merchant site may be able to obtain the buyer information from a cookie or other information available from the buyer device.

At 712, the computing device may send the item information and the buyer information to the service computing device. For example, the merchant site may send the item information and the buyer information to the service computing device for association with the persistent virtual cart maintained by the service computing device in association with the buyer profile of the buyer.

At 714, the computing device receives, from the service computing device, an order for the item from the buyer. For example, the buyer may instruct the service computing device to place an order for the item on behalf of the buyer. In some examples, the order may include a confirmation that the buyer has provided a payment for the item. In other examples, the order may include information indicating that the buyer will provide payment at the point of sale location of the merchant when the buyer picks up the ordered item. In addition, the order may include other information such as an expected pickup time for each item, a delivery address for the items, shipping address for the items, or various other types of information as mentioned above.

At 716, the computing device may send the order and the buyer information to a merchant computing device at a POS location. For example, in response to receiving the order the merchant site may send a communication to a merchant computing device at a POS location to inform the merchant that the buyer will be picking up the ordered item, expecting delivery of the ordered item, or the like.

At 718, the computing device may send an order confirmation to at least one of the service computing device or the buyer device. For instance, the order may have included contact information for the buyer, and the site computing device may send the order confirmation to this contact information. Additionally, or alternatively, the order confirmation may be sent to the service computing device, which may forward the order confirmation to the buyer device. As still another alternative, the merchant POS device may send the order confirmation to at least one of the service computing device or the buyer device.

The example processes described herein are only examples of processes provided for discussion purposes. Numerous other variations will be apparent to those of skill in the art in light of the disclosure herein. Further, while the disclosure herein sets forth several examples of suitable frameworks, architectures and environments for executing the processes, implementations herein are not limited to the particular examples shown and discussed. Furthermore, this disclosure provides various example implementations, as described and as illustrated in the drawings. However, this disclosure is not limited to the implementations described and illustrated herein, but can extend to other implementations, as would be known or as would become known to those skilled in the art.

Figure 8:
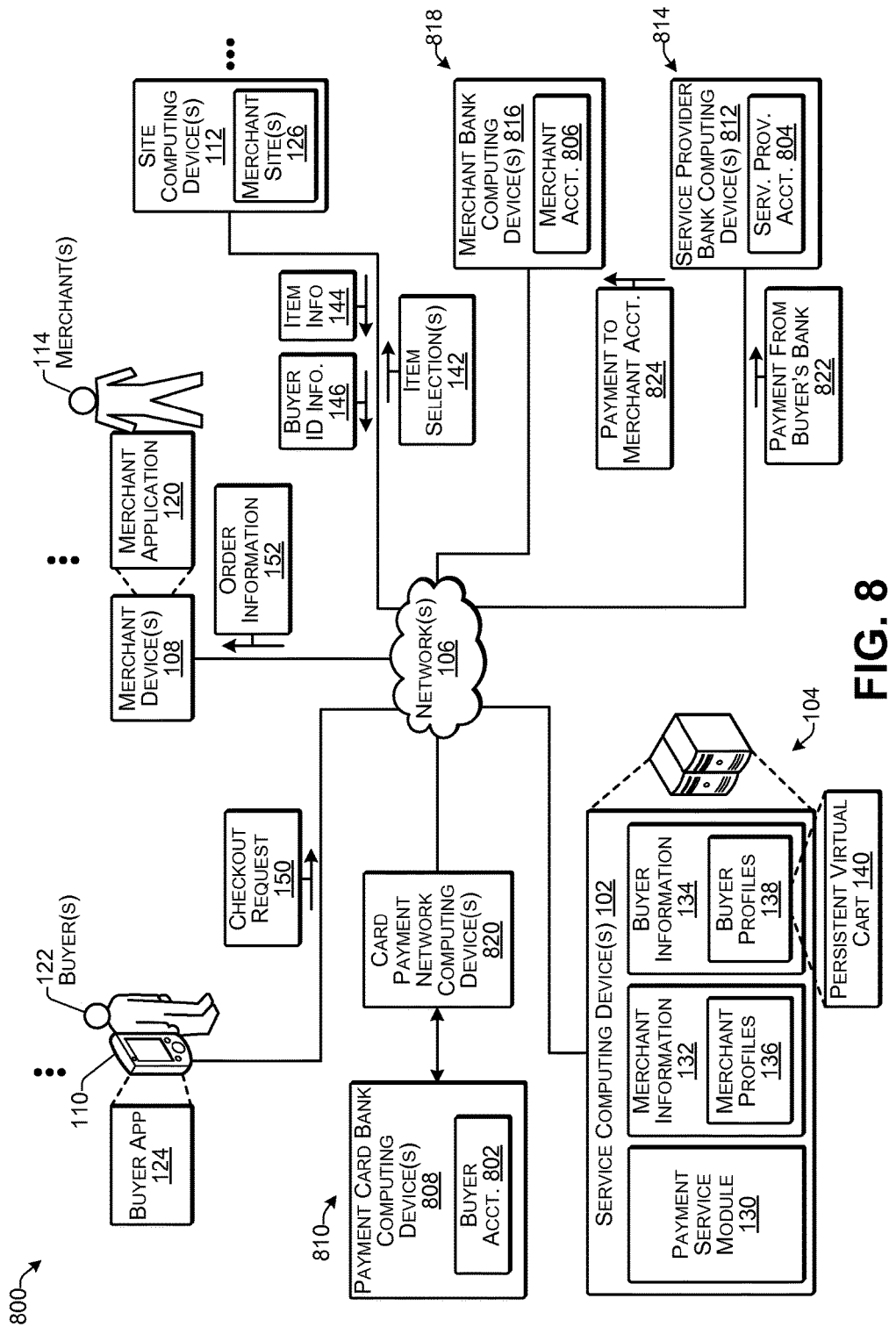
FIG. 8 illustrates an example system for implementing a persistent virtual cart and payment service according to some implementations.

FIG. 8 illustrates an example architecture of a payment system 800 able to provide a persistent virtual cart and payment service according to some implementations. In the example of FIG. 8, the service computing device 102 of the service provider 104 includes the payment service module 130, which may be executed to provide the persistent virtual cart and payment service discussed herein. The payment system 800 may further include the one or more merchant devices 108 associated with one or more respective merchants 114 and one or more buyer devices 110 associated with one or more respective buyers 122. The payment system 800 may further include the one or more site computing devices 112 for providing one or more merchant sites 126. Accordingly, the service computing device 102, the merchant device 108, the buyer device 110, and the site computing device 112 may be able to communicate with each other over the one or more networks 106.

The one or more networks 106 can include any appropriate network, including a wide area network, such as the Internet; a local area network, such as an intranet; a wireless network, such as a cellular network, a local wireless network, such as Wi-Fi and/or close-range wireless communications, such as BLUETOOTH® and BLUETOOTH® low energy; a wired network; or any other communication network, or any combination thereof. Accordingly, the one or more networks 106 may include both wired and/or wireless communication technologies, including BLUETOOTH®, BLUETOOTH® low energy, Wi-Fi and cellular communication technologies, as well as wired or fiber optic technologies. Components used for such communications can depend at least in part upon the type of network, the environment selected, or both. Protocols for communicating over such networks are well known and will not be discussed herein in detail.

The service computing device 102 may include one or more servers that are configured to perform secure electronic financial transactions, e.g., electronic payments for transactions between the buyer and the merchant, such as through data communicated between the buyer device 110 and the service computing device 102, and data communicated between the merchant device 108 and the service computing device 102 and/or data communicated between the site computing device 112 and the service computing device 102. In some examples, when a buyer 122 and a merchant 114 enter into an electronic payment transaction, such as for payment of a bill, the transaction is processed by electronically transferring funds from a financial account associated with a buyer profile 138, i.e., a buyer account 802, to a financial account associated with the service provider 104, i.e., a service provider account 804, and transferring funds from the service provider account 804 to a financial account associated with a merchant profile 136, i.e., a merchant account 806.

In some examples, the buyer account 802 may be maintained by one or more payment card bank computing devices 808 associated with a card-issuing bank 810 that issued a payment card to the buyer 122. For example, the buyer 122 may have provided payment card information from a particular payment card to the service provider 104 when signing up to use the electronic payment capability offered by the buyer application 124. Furthermore, the service provider account 804 may be maintained by one or more service provider bank computing devices 812 associated with a service provider bank 814. Additionally, the merchant account 806 may be maintained by one or more merchant bank computing devices 816 associated with a merchant bank 818.

The payment service module 130 and/or the merchant application 120 can also be configured to communicate with the one or more computing devices 820 of a card payment network (e.g., MASTERCARD®, VISA®) over the one or more networks 106 to obtain authorizations to charge payments to the buyer account 802. For example, the payment service module 130 may communicate with the service provider bank 814, which acts as an acquiring bank, and/or may communicate directly or indirectly with the buyer bank 810, which acts as an issuing bank. An acquiring bank may be a registered member of a card association (e.g., VISA®, MASTERCARD®), and may be part of a card payment network. An issuing bank may issue payment cards to buyers, and may pay acquiring banks for purchases made by cardholders to which the issuing bank has issued a payment card. Accordingly, in some examples, the computing device of an acquiring bank may communicate with the computing device of a card-issuing bank to obtain payment. Further, in some examples, the buyer may use a debit card instead of a credit card, in which case, the bank computing device of a bank corresponding to the debit card may receive communications regarding a transaction in which the buyer is participating. Additionally, there may be computing devices of other financial institutions involved in some types of transactions or in alternative system architectures, and thus, the foregoing are merely several examples for discussion purposes.

As part of providing a payment service to the merchant 108 for some types of payment instruments, the payment service module 130 may receive transaction information from the merchant device 108 for processing payments made by buyers. For example, the payment service module 130 may receive transaction information, such as an amount of a POS transaction and payment instrument information. Thus, if the buyer 122 is using a payment card to tender payment to the merchant 114 in person, the payment service module 130 may verify that the payment card is able to be used to pay for the transaction, such as by contacting a card payment network clearinghouse computing device 820 or a payment card bank computing device 808.

In addition to payment cards, a buyer 122 may carry the buyer device 110, as discussed above. The buyer device 110 may include the buyer application 124, which enables an associated electronic payment account to be used as a payment instrument, both remotely and in person. In some cases, the electronic payment account of the buyer 122 may be linked to one of the buyer's payment cards, such as a credit card, or other buyer account 802. Accordingly, the buyer application 124 may enable the buyer 122 to pay for a transaction with the linked credit card without having to produce the credit card, thereby enabling a card-less payment to the merchant with the credit card.

The buyer application 124 and the corresponding electronic payment account, can be associated with the buyer profile 138 and various buyer information 134 including, for example, the buyer's name, information describing the payment card linked to the electronic payment account, and an email address linked to the electronic payment account to which receipts can be sent for electronic payment transactions that are conducted by the buyer 122 using the buyer application 124. Further, as an alternative to linking the electronic payment account to a credit card, the electronic payment account may be a different type of account, such as a billing account, a debit account, a savings account, a prepaid account having a prepaid quantity of money deposited therein, or the like. Additionally, while only a single buyer device 110 and a single merchant device 108 are illustrated in the example of FIG. 8, in some implementations, there may be thousands, hundreds of thousands, or more, of the buyer devices 110 and the merchant devices 108 associated with respective buyers 122 and respective merchants 114.

In general, when paying for a transaction, the buyer 122 can provide the amount of payment that is due to the merchant 114 using cash, check, a payment card, or by electronic payment using the buyer application 124 on the buyer device 110. The merchant 114 can interact with the merchant device 108 to process the transaction. For example, when the buyer is paying for a transaction electronically with the buyer application 124, the payment service module may contact the card payment network computing device 820 with the payment card information and the transaction amount to receive authorization for charging the buyer's payment card account 802 in the amount of the transaction. Similarly, if the buyer 122 were to pay the merchant with a physical payment card, the merchant application 120 may obtain payment authorization from the payment card network computing device 820 either directly or via the payment service module 130 of the service provider 104. During POS transactions, the merchant device 108 can determine and send data describing the transactions, including, for example, the item(s) being purchased, the amount of the item(s), buyer information, and so forth. In some implementations, the payment service enables a cardless payment transaction, which may include a transaction conducted between the buyer 122 and the merchant 114 by which an electronic payment account of the buyer 122 is charged without the buyer 122 having to physically present a payment card to the merchant 114. Consequently, the merchant 114 need not receive any details about the financial account of the buyer 122 for the transaction to be processed.

When the buyer 122 authorizes the payment service module 130 to charge the buyer's electronic account, such as when checking out the persistent virtual cart 140 online, the payment service module 130 may apply the charge to the payment card that the buyer 122 has previously provided in connection with the buyer application 124 and the buyer profile 138 of the buyer. Subsequently, the payment card issuing bank 810 may transfer the payment from the buyer account 802 to the service provider bank 814 as a payment 822 from the buyer's bank. Further, the payment service module 130 may credit the merchant's account, and may make a payment 824 from the service provider account 804 to the merchant account 806. As one example, both the payment 822 from the buyer's bank 810 to the service provider bank 814, and the payment 824 from the service provider bank 814 to the merchant account 806 at the merchant bank 818 may be made through batch fund transfers. For instance, in the United States, bank-to-bank transfers of funds may be made using a batch fund transfer technique referred to as an ACH (automated clearing house) payment. ACH payments employ a convention adopted by the United States banking industry that includes an electronic network for financial transactions in the United States. ACH includes processing of large volumes of credit and debit transactions in batches. Both the US government and the commercial financial sectors use ACH payments. Rules and regulations that govern the ACH network are established by NACHA (National Automated Clearing House Association) and the Federal Reserve. Further, in other countries, similar batch fund transfer techniques may be employed.

Figure 9:
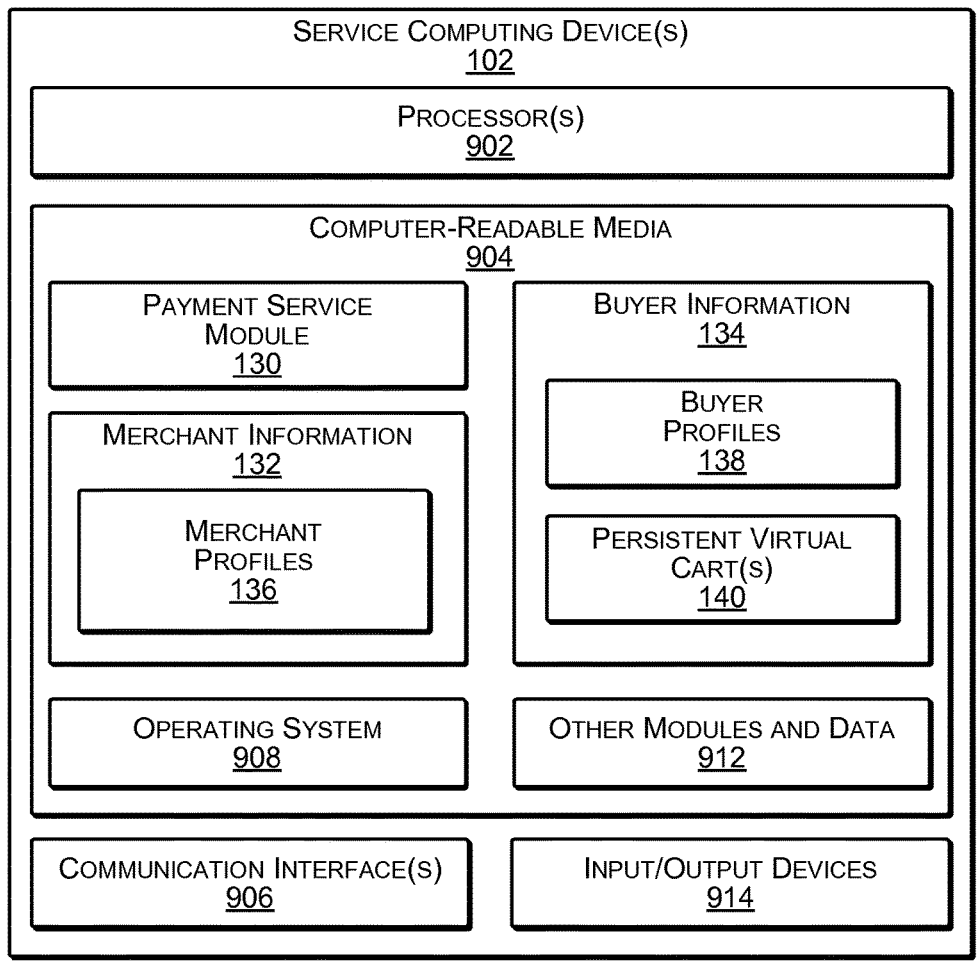
FIG. 9 illustrates select components of an example service computing device according to some implementations.

FIG. 9 illustrates select components of the service computing device 102 that may be used to implement some functionality of the payment service described herein. The service computing device 102 may be maintained and/or operated by the service provider 104 that provides the persistent virtual cart and payment service, and may include one or more servers or other types of computing devices that may be embodied in any number of ways. For instance, in the case of a server, the modules, other functional components, and data may be implemented on a single server, a cluster of servers, a server farm or data center, a cloud-hosted computing service, a cloud-hosted storage service, and so forth, although other computer architectures may additionally or alternatively be used.

Further, while the figures illustrate the components and data of the service computing device 102 as being present in a single location, these components and data may alternatively be distributed across different computing devices and different locations in any manner. Consequently, the functions may be implemented by one or more service computing devices, with the various functionality described above distributed in various ways across the different computing devices. Multiple service computing devices 102 may be located together or separately, and organized, for example, as virtual servers, server banks and/or server farms. The described functionality may be provided by the servers of a single entity or enterprise, or may be provided by the servers and/or services of multiple different buyers or enterprises.

In the illustrated example, each service computing device 102 may include one or more processors 902, one or more computer-readable media 904, and one or more communication interfaces 906. Each processor 902 may be a single processing unit or a number of processing units, and may include single or multiple computing units or multiple processing cores. The processor(s) 902 can be implemented as one or more microprocessors, microcomputers, microcontrollers, digital signal processors, central processing units, state machines, logic circuitries, and/or any devices that manipulate signals based on operational instructions. For instance, the processor(s) 902 may be one or more hardware processors and/or logic circuits of any suitable type specifically programmed or otherwise configured to execute the algorithms and processes described herein. The processor(s) 902 can be configured to fetch and execute computer-readable instructions stored in the computer-readable media 904, which can program the processor(s) 902 to perform the functions described herein.

The computer-readable media 904 may include volatile and nonvolatile memory and/or removable and non-removable media implemented in any type of technology for storage of information, such as computer-readable instructions, data structures, program modules, or other data. Such computer-readable media 904 may include, but is not limited to, RAM, ROM, EEPROM, flash memory or other memory technology, optical storage, solid state storage, magnetic tape, magnetic disk storage, RAID storage systems, storage arrays, network attached storage, storage area networks, cloud storage, or any other medium that can be used to store the desired information and that can be accessed by a computing device. Depending on the configuration of the service computing device 102, the computer-readable media 904 may be a type of computer-readable storage media and/or may be a tangible non-transitory media to the extent that, when mentioned, non-transitory computer-readable media exclude media such as energy, carrier signals, electromagnetic waves, and signals per se.

The computer-readable media 904 may be used to store any number of functional components that are executable by the processors 902. In many implementations, these functional components comprise instructions or programs that are executable by the processors 902 and that, when executed, specifically configure or otherwise program the one or more processors 902 to perform the actions attributed above to the service computing device 102. Functional components stored in the computer-readable media 904 may include the payment service module 130, as described above, which may be executed to provide the persistent virtual cart and other aspects of the payment service. Additional functional components stored in the computer-readable media 904 may include an operating system 908 for controlling and managing various functions of the service computing device(s) 102.

In addition, the computer-readable media 904 may store data used for performing the operations described herein. Thus, the computer-readable media may store the merchant information 132, including the merchant profiles 136, and the buyer information 134, including the buyer profiles 138. Further, the computer-readable media 904 may store, in association with the buyer profiles 138, persistent virtual carts 140 and related information. For example, each persistent virtual cart 140 may include one or more data structures that may include item information for items that have been added to a cart, information regarding merchant profiles corresponding to the item information, and information regarding particular buyer profiles associated with particular respective persistent virtual carts 140. The service computing device 102 may also include or maintain other functional components and data, such as other modules and data 912, which may include programs, drivers, etc., and the data used or generated by the functional components. Further, the service computing device 102 may include many other logical, programmatic and physical components, of which those described above are merely examples that are related to the discussion herein.

The communication interface(s) 906 may include one or more interfaces and hardware components for enabling communication with various other devices, such as over the network(s) 106. For example, communication interface(s) 906 may enable communication through one or more of the Internet, cable networks, cellular networks, wireless networks (e.g., Wi-Fi) and wired networks, as well as close-range communications, and the like, as additionally enumerated elsewhere herein.

The service computing device 102 may further be equipped with various input/output (I/O) devices 914. Such I/O devices 914 may include a display, various user interface controls (e.g., buttons, joystick, keyboard, mouse, touch screen, etc.), audio speakers, connection ports, and so forth.

Figure 10:
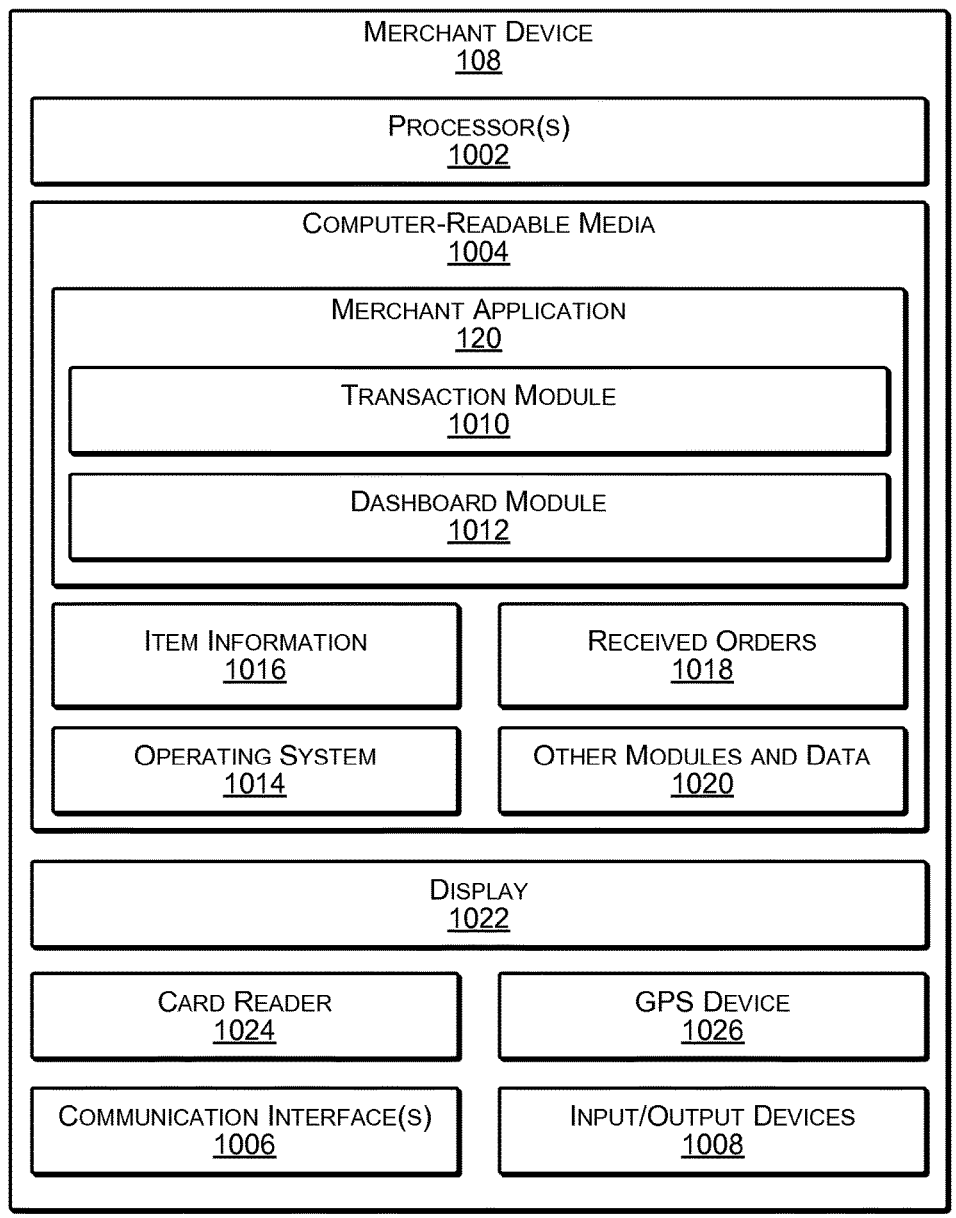
FIG. 10 illustrates select components of an example merchant device according to some implementations.

FIG. 10 illustrates select example components of an example merchant device 108 according to some implementations. The merchant device 108 may be any suitable type of computing device, e.g., portable, semi-portable, semi-stationary, or stationary. Some examples of the merchant device 108 may include tablet computing devices; smart phones and mobile communication devices; laptops, netbooks and other portable computers or semi-portable computers; desktop computing devices, terminal computing devices and other semi-stationary or stationary computing devices; dedicated register devices; wearable computing devices, or other body-mounted computing devices; augmented reality devices; or other computing devices capable of sending communications and performing the functions according to the techniques described herein.

In the illustrated example, the merchant device 108 includes at least one processor 1002, one or more computer-readable media 1004, one or more communication interfaces 1006, and one or more input/output (I/O) devices 1008. Each processor 1002 may itself comprise one or more processors or processing cores. For example, the processor 1002 can be implemented as one or more microprocessors, microcomputers, microcontrollers, digital signal processors, central processing units, state machines, logic circuitries, and/or any devices that manipulate signals based on operational instructions. In some cases, the processor 1002 may be one or more hardware processors and/or logic circuits of any suitable type specifically programmed or otherwise configured to execute the algorithms and processes described herein. The processor 1002 can be configured to fetch and execute computer-readable processor-executable instructions stored in the computer-readable media 1004.

Depending on the configuration of the merchant device 108, the computer-readable media 1004 may be an example of tangible non-transitory computer storage media and may include volatile and nonvolatile memory and/or removable and non-removable media implemented in any type of technology for storage of information such as computer-readable processor-executable instructions, data structures, program modules or other data. The computer-readable media 1004 may include, but is not limited to, RAM, ROM, EEPROM, flash memory, solid-state storage, magnetic disk storage, optical storage, and/or other computer-readable media technology. Further, in some cases, the merchant device 108 may access external storage, such as RAID storage systems, storage arrays, network attached storage, storage area networks, cloud storage, or any other medium that can be used to store information and that can be accessed by the processor 1002 directly or through another computing device or network. Accordingly, the computer-readable media 1004 may be computer storage media able to store instructions, modules or components that may be executed by the processor 1002. Further, when mentioned, non-transitory computer-readable media exclude media such as energy, carrier signals, electromagnetic waves, and signals per se.

The computer-readable media 1004 may be used to store and maintain any number of functional components that are executable by the processor 1002. In some implementations, these functional components comprise instructions or programs that are executable by the processor 1002 and that, when executed, implement operational logic for performing the actions and services attributed above to the merchant device 108. Functional components of the merchant device 108 stored in the computer-readable media 1004 may include the merchant application 120. In this example, the merchant application 120 includes a transaction module 1010 and a dashboard module 1012. For example, the transaction module 1010 may present an interface, such as a payment GUI, to enable the merchant to conduct transactions, receive orders from the persistent virtual cart, receive notifications of payments for items purchased through the persistent virtual cart, and so forth. In addition, the transaction module 1010 may communicate with the service computing device 102 for processing payments and sending transaction information, and may communicate with the site computing device for exchanging information with the associated merchant site. Further, the dashboard module 1012 may present a setup interface to enable the merchant to setup items, such as for adding new items to a menu, modifying item information for existing items, and so forth. The dashboard module 1012 may further enable the merchant to manage the merchant's account, the merchant's profile, merchant's preferences, view saved or new information, and the like. Additional functional components may include an operating system 1014 for controlling and managing various functions of the merchant device 108 and for enabling basic user interactions with the merchant device 108.

In addition, the computer-readable media 1004 may also store data, data structures, and the like, that are used by the functional components. For example, data stored by the computer-readable media 1004 may include item information 1016 that includes information about the items offered by the merchant, which may include a menu or other list of items currently available from the merchant, images of the items, descriptions of the items, prices of the items, and so forth. Furthermore, the computer-readable media may also include received orders 1018, which may include orders for items received from the service computing device 102 as a result of a buyer checking out a persistent virtual cart. Depending on the type of the merchant device 108, the computer-readable media 1004 may also optionally include other functional components and data, such as other modules and data 1020, which may include programs, drivers, etc., and the data used or generated by the functional components. Further, the merchant device 108 may include many other logical, programmatic and physical components, of which those described are merely examples that are related to the discussion herein.

The communication interface(s) 1006 may include one or more interfaces and hardware components for enabling communication with various other devices, such as over the network(s) 106 or directly. For example, communication interface(s) 1006 may enable communication through one or more of the Internet, cable networks, cellular networks, wireless networks (e.g., Wi-Fi) and wired networks, as well as close-range communications such as BLUETOOTH®, BLUETOOTH® low energy, and the like, as additionally enumerated elsewhere herein.

FIG. 10 further illustrates that the merchant device 108 may include a display 1022. Depending on the type of computing device used as the merchant device 108, the display 1022 may employ any suitable display technology. For example, the display 1022 may be a liquid crystal display, a plasma display, a light emitting diode display, an OLED (organic light-emitting diode) display, an electronic paper display, or any other suitable type of display able to present digital content thereon. In some examples, the display 1022 may have a touch sensor associated with the display 1022 to provide a touchscreen display configured to receive touch inputs for enabling interaction with a GUI presented on the display 1022. Accordingly, implementations herein are not limited to any particular display technology. Alternatively, in some examples, the merchant device 108 may not include the display 1022, and information may be presented by other means, such as aurally.

The merchant device 108 may further include the one or more I/O devices 1008. The I/O devices 1008 may include speakers, a microphone, a camera, and various user controls (e.g., buttons, a joystick, a keyboard, a keypad, etc.), a haptic output device, and so forth.

In addition, the merchant device 108 may include or may be connectable to a payment card reader 1024. In some examples, the card reader 1024 may plug in to a port in the merchant device 108, such as a microphone/headphone port, a data port, or other suitable port. The card reader 1024 may include a read head for reading a magnetic strip of a payment card, and further may include encryption technology for encrypting the information read from the magnetic strip. Alternatively, numerous other types of card readers may be employed with the merchant device 108 herein, depending on the type and configuration of the merchant device 108.

Other components included in the merchant device 108 may include various types of sensors, which may include a GPS device 1026 able to indicate location information, as well as other sensors (not shown) such as an accelerometer, gyroscope, compass, proximity sensor, barcode scanner, and the like. Additionally, the merchant device 108 may include various other components that are not shown, examples of which include removable storage, a power source, such as a battery and power control unit, and so forth.

Figure 11:
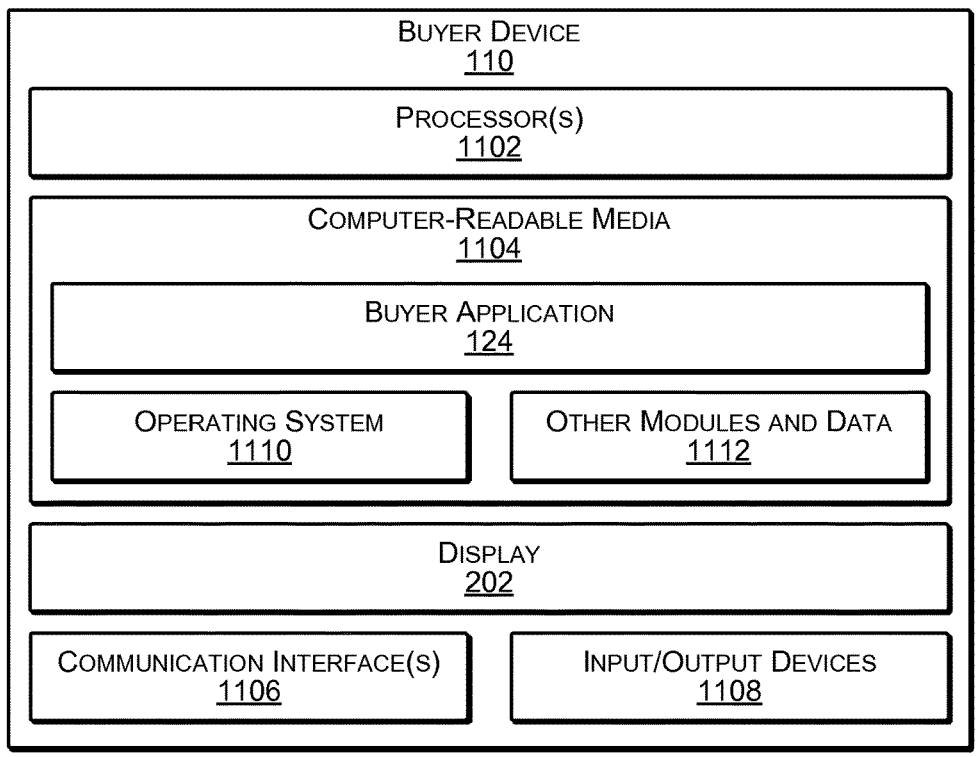
FIG. 11 illustrates select components of an example buyer device according to some implementations.

FIG. 11 illustrates select example components of the buyer device 110 that may implement the functionality described above according to some examples. As mentioned above, the buyer device 110 may be any of a number of different types of computing devices. Some examples of the buyer device 110 may include smart phones and mobile communication devices; tablet computing devices; laptop computers, netbooks and other portable computers; wearable computing devices and/or body-mounted computing devices, which may include watches, wrist bands, and augmented reality devices, such as helmets, goggles or glasses; and any other portable device capable of sending communications and performing the functions according to the techniques described herein. Additionally, in other examples, the buyer device may include stationary and semi-stationary computing devices, such as laptop computers, desktop computers, terminals, workstations, or the like.

In the example of FIG. 11, the buyer device 110 includes components such as at least one processor 1102, one or more computer-readable media 1104, the one or more communication interfaces 1106, and one or more input/output (I/O) devices 1108. Each processor 1102 may itself comprise one or more processors or processing cores. For example, the processor 1102 can be implemented as one or more microprocessors, microcomputers, microcontrollers, digital signal processors, central processing units, state machines, logic circuitries, and/or any devices that manipulate signals based on operational instructions. In some cases, the processor 1102 may be one or more hardware processors and/or logic circuits of any suitable type specifically programmed or otherwise configured to execute the algorithms and processes described herein. The processor 1102 can be configured to fetch and execute computer-readable processor-executable instructions stored in the computer-readable media 1104.

Depending on the configuration of the buyer device 110, the computer-readable media 1104 may be an example of tangible non-transitory computer storage media and may include volatile and nonvolatile memory and/or removable and non-removable media implemented in any type of technology for storage of information such as computer-readable processor-executable instructions, data structures, program modules or other data. The computer-readable media 1104 may include, but is not limited to, RAM, ROM, EEPROM, flash memory, solid-state storage, magnetic disk storage, optical storage, and/or other computer-readable media technology. Further, in some cases, the buyer device 110 may access external storage, such as RAID storage systems, storage arrays, network attached storage, storage area networks, cloud storage, or any other medium that can be used to store information and that can be accessed by the processor 1102 directly or through another computing device or network. Accordingly, the computer-readable media 1104 may be computer storage media able to store instructions, modules or components that may be executed by the processor 1102. Further, when mentioned, non-transitory computer-readable media exclude media such as energy, carrier signals, electromagnetic waves, and signals per se.

The computer-readable media 1104 may be used to store and maintain any number of functional components that are executable by the processor 1102. In some implementations, these functional components comprise instructions or programs that are executable by the processor 1102 and that, when executed, implement operational logic for performing the actions and services attributed above to the buyer device 110. Functional components of the buyer device 110 stored on the computer-readable media 1104 may include the buyer application 124, as discussed above. In some examples, the buyer application 124 may include a browser or other application able to access websites, ecommerce sites or other online sites maintained by the merchants and/or the service provider. In some cases, the buyer application 124 may present the buyer with one or more GUIs, such as for viewing items available from various merchants; adding selected items to the persistent virtual cart; viewing, editing and checking out the persistent virtual cart; making or otherwise instructing payments, managing the buyer's account, changing buyer profile information, changing buyer preferences, and so forth. Further, in some examples, the buyer application may enable the buyer make electronic payments, such as at a POS location. Additional functional components may include an operating system 1110 for controlling and managing various functions of the buyer device 110 and for enabling basic user interactions with the buyer device 110.

In addition, the computer-readable media 1104 may also store data, data structures and the like, that are used by the functional components. Depending on the type of the buyer device 110, the computer-readable media 1104 may also optionally include other functional components and data, such as other modules and data 1112, which may include applications, programs, drivers, etc., and the data used or generated by the functional components. Further, the buyer device 110 may include many other logical, programmatic and physical components, of which those described are merely examples that are related to the discussion herein.

The communication interface(s) 1106 may include one or more interfaces and hardware components for enabling communication with various other devices, such as over the network(s) 106 or directly. For example, communication interface(s) 1106 may enable communication through one or more of the Internet, cable networks, cellular networks, wireless networks (e.g., Wi-Fi) and wired networks, as well as close-range communications such as BLUETOOTH®, BLUETOOTH® low energy, and the like, as additionally enumerated elsewhere herein.

FIG. 11 further illustrates that the buyer device 110 may include the display 202, mentioned above. Depending on the type of computing device used as the buyer device 110, the display 202 may employ any suitable display technology. For example, the display 202 may be a liquid crystal display, a plasma display, a light emitting diode display, an OLED (organic light-emitting diode) display, an electronic paper display, or any other suitable type of display able to present digital content thereon. In some examples, the display 202 may have a touch sensor associated with the display 202 to provide a touchscreen display configured to receive touch inputs for enabling interaction with a GUI presented on the display 202. Accordingly, implementations herein are not limited to any particular display technology. Alternatively, in some examples, the buyer device 110 may not include a display.

The buyer device 110 may further include the one or more I/O devices 1108. The I/O devices 1108 may include speakers, a microphone, a camera, and various user controls (e.g., buttons, a joystick, a keyboard, a keypad, etc.), a haptic output device, and so forth.

Other components included in the buyer device 110 may include various types of sensors (not shown), which may include a GPS (Global Positioning System) device able to indicate location information, as well as other sensors such as an accelerometer, gyroscope, compass, proximity sensor, and the like. Additionally, the buyer device 110 may include various other components that are not shown, examples of which include removable storage, a power source, such as a battery and power control unit, and so forth.

Figure 12:
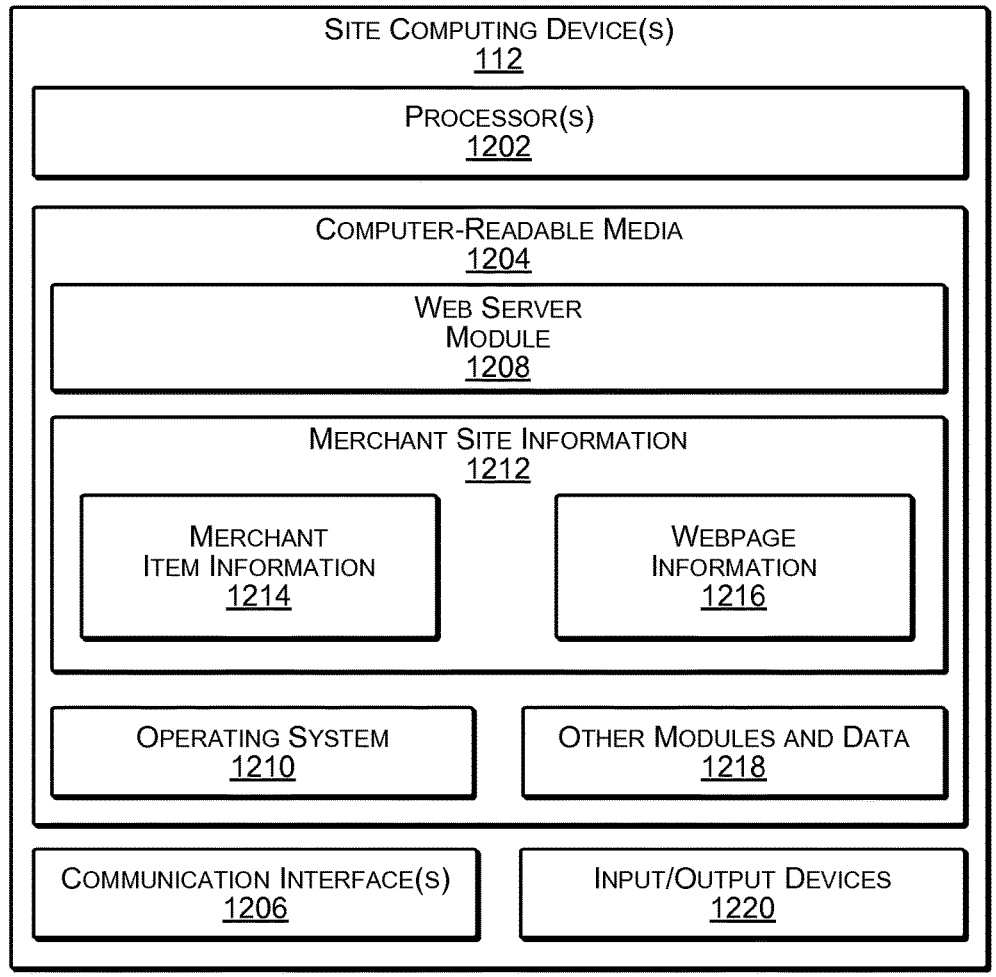
FIG. 12 illustrates select components of an example site computing device according to some implementations.

FIG. 12 illustrates select components of the site computing device 112 that may be used to implement some functionality and interaction with the persistent virtual cart and payment service described herein. The site computing device 112 may be maintained and/or operated by a merchant, a web service that hosts websites, or the like, and may include one or more servers or other types of computing devices that may be embodied in any number of ways. For instance, in the case of a server, the modules, other functional components, and data may be implemented on a single server, a cluster of servers, a server farm or data center, a cloud-hosted computing service, a cloud-hosted storage service, and so forth, although other computer architectures may additionally or alternatively be used.

Further, while the figures illustrate the components and data of the site computing device 112 as being present in a single location, these components and data may alternatively be distributed across different computing devices and different locations in any manner. Consequently, the functions may be implemented by one or more site computing devices, with the various functionality described above distributed in various ways across the different computing devices. Multiple site computing devices 112 may be located together or separately, and organized, for example, as virtual servers, server banks and/or server farms. The described functionality may be provided by the servers of a single entity or enterprise, or may be provided by the servers and/or services of multiple different buyers or enterprises.

In the illustrated example, each site computing device 112 may include one or more processors 1202, one or more computer-readable media 1204, and one or more communication interfaces 1206. Each processor 1202 may be a single processing unit or a number of processing units, and may include single or multiple computing units or multiple processing cores. The processor(s) 1202 can be implemented as one or more microprocessors, microcomputers, microcontrollers, digital signal processors, central processing units, state machines, logic circuitries, and/or any devices that manipulate signals based on operational instructions. For instance, the processor(s) 1202 may be one or more hardware processors and/or logic circuits of any suitable type specifically programmed or otherwise configured to execute the algorithms and processes described herein. The processor(s) 1202 can be configured to fetch and execute computer-readable instructions stored in the computer-readable media 1204, which can program the processor(s) 1202 to perform the functions described herein.

The computer-readable media 1204 may include volatile and nonvolatile memory and/or removable and non-removable media implemented in any type of technology for storage of information, such as computer-readable instructions, data structures, program modules, or other data. Such computer-readable media 1204 may include, but is not limited to, RAM, ROM, EEPROM, flash memory or other memory technology, optical storage, solid state storage, magnetic tape, magnetic disk storage, RAID storage systems, storage arrays, network attached storage, storage area networks, cloud storage, or any other medium that can be used to store the desired information and that can be accessed by a computing device. Depending on the configuration of the site computing device 112, the computer-readable media 1204 may be a type of computer-readable storage media and/or may be a tangible non-transitory media to the extent that, when mentioned, non-transitory computer-readable media exclude media such as energy, carrier signals, electromagnetic waves, and signals per se.

The computer-readable media 1204 may be used to store any number of functional components that are executable by the processors 1202. In many implementations, these functional components comprise instructions or programs that are executable by the processors 1202 and that, when executed, specifically configure or otherwise program the one or more processors 1202 to perform the actions attributed above to the site computing device 112 and the merchant site 126. For example, the site computing device 112 may include one or more applications, data structures and data as part of a web server module 1208 for hosting a merchant site. Additional functional components stored in the computer-readable media 1204 may include an operating system 1210 for controlling and managing various functions of the site computing device 112.

In addition, the computer-readable media 1204 may store data used for performing the operations described herein. For example, the computer-readable media may store merchant site information 1212, which may include merchant item information 1214 and merchant webpage information 1216. For example, the merchant item information 1214 may include information about the various items offered by the merchant, such as item descriptions, item photographs, videos, or other images, item sizes, styles, colors, flavors, and other item attributes, etc. Further, the computer-readable media 1204 may store merchant webpage information 1216, which may include one or more data structures, HTML code, JAVASCRIPT® code, and so forth to enable a buyer device that downloads the webpage information 1216 to present information related to one or more items offered by the merchant in a GUI, such as may be presented by a browser or other buyer application. The site computing device 112 may also include or maintain other functional components and data, such as other modules and data 1218, which may include programs, drivers, etc., and the data used or generated by the functional components. Further, the site computing device 112 may include many other logical, programmatic and physical components, of which those described above are merely examples that are related to the discussion herein.

The communication interface(s) 1206 may include one or more interfaces and hardware components for enabling communication with various other devices, such as over the network(s) 106. For example, communication interface(s) 1206 may enable communication through one or more of the Internet, cable networks, cellular networks, wireless networks (e.g., Wi-Fi) and wired networks, as well as close-range communications, and the like, as additionally enumerated elsewhere herein.

The site computing device 112 may further be equipped with various input/output (I/O) devices 1220. Such I/O devices 1220 may include a display, various user interface controls (e.g., buttons, joystick, keyboard, mouse, touch screen, etc.), audio speakers, connection ports, and so forth.

Various instructions, methods and techniques described herein may be considered in the general context of computer-executable instructions, such as program modules stored on computer-readable media, and executed by the processor(s) herein. Generally, program modules include routines, programs, objects, components, data structures, etc., for performing particular tasks or implementing particular abstract data types. These program modules, and the like, may be executed as native code or may be downloaded and executed, such as in a virtual machine or other just-in-time compilation execution environment. Typically, the functionality of the program modules may be combined or distributed as desired in various implementations. An implementation of these modules and techniques may be stored on computer storage media or transmitted across some form of communication media.

Although the subject matter has been described in language specific to structural features and/or methodological acts, it is to be understood that the subject matter defined in the appended claims is not necessarily limited to the specific features or acts described. Rather, the specific features and acts are disclosed as example forms of implementing the claims.

What is claimed is:

1. A computing device comprising:
    a display;
    one or more processors able to communicate with the display; and
    one or more computer-readable media storing instructions executable by the one or more processors, wherein the instructions program the one or more processors to:
        present, on the display, a first graphic user interface (GUI) including information from a first merchant site associated with a first merchant, wherein the information from the first merchant site includes information related to a first item offered by the first merchant, the first GUI further including a first virtual control selectable for adding the first item to a persistent virtual cart maintained by a service computing device associated with a payment service;
        receive, via the first GUI, a selection of the first virtual control for adding the first item to the persistent virtual cart, wherein the selection of the first virtual control causes the information related to the first item and information indicating a buyer profile to be sent to the service computing device for association with the persistent virtual cart;
        present on the display, a second GUI including information from a second merchant site associated with a second merchant, wherein the information from the second merchant site includes information related to a second item offered by the second merchant, the second GUI further including a second virtual control selectable for adding the second item to the persistent virtual cart maintained by the service computing device, wherein the second merchant is different from the first merchant;
        receive, via the second GUI, a selection of the second virtual control for adding the second item to the persistent virtual cart, wherein the selection of the second virtual control causes the information related to the second item and information indicating the buyer profile to be sent to the service computing device for association with the persistent virtual cart;
        subsequent to receiving the selection of the first virtual control and the selection of the second virtual control, present on the display, a third GUI including information received from the service computing device that includes a representation of contents of the persistent virtual cart, the contents including the information related to the first item, the information related to the second item and modifiable options corresponding to delivery and pick up of at least one of the first item or the second item, the modifiable options allowing modification, prior to purchasing the first item or the second item, to at least one of the delivery or pick up of the first item or the second item; and send, to the service computing device, based at least in part on a user input, an instruction to purchase the contents of the persistent virtual cart, the instruction causing the service provider to send order information related to the first item to a first computing device associated with the first merchant and order information related to the second item to a second computing device associated with the second merchant.

2. The computing device as recited in claim 1, wherein the instructions further program the one or more processors to:
present, in the third GUI, a payment confirmation request; and
send, based at least in part on an additional user input received via the third GUI, a payment confirmation to authorize the service provider to charge a buyer account associated with the buyer profile for an amount corresponding to the contents of the persistent virtual cart.

3. The computing device as recited in claim 1, wherein the instructions further program the one or more processors to present, on the display, an order confirmation received from at least one of the first computing device associated with the first merchant or the second computing device associated with the second merchant.

4. The computing device as recited in claim 1, wherein the first computing device associated with the first merchant is one of:
a merchant point-of-sale computing device at a point-of-sale location associated with the first merchant; or
a web server computing device configured to provide a merchant site associated with the first merchant.

5. A method comprising:
receiving, via a first graphic user interface (GUI), a selection of a first virtual control, wherein the selection of the first virtual control causes information related to a first item associated with a first merchant site to be sent to a service computing device for association with a persistent virtual cart;
receiving, via the second GUI, a selection of the second virtual control for adding, wherein the selection of the second virtual control causes information related to a second item associated with a second merchant site to be sent to the service computing device for association with the persistent virtual cart;
presenting a third GUI including a representation of items associated with the persistent virtual cart, the representation of items including at least a portion of the information related to the first item, at least a portion of the information related to the second item and modifiable options corresponding to delivery and pick up of at least one of the first item or the second item, the modifiable options allowing modification, prior to purchasing the first item or the second item, to at least one of the delivery or pick up of the first item or the second item; and
sending, based at least in part on an input received via the third GUI, an instruction to the service computing device to order the first item and the second item.

6. The method as recited in claim 5, wherein sending the instruction to the service computing device further comprises sending a payment authorization to authorize the service computing device to charge an account associated with the persistent virtual cart for purchase of the first item and the second item.

7. The method as recited in claim 5, further comprising, in response to receiving the selection of the first virtual control, presenting a fourth GUI to request entry of buyer identifying information for associating the persistent virtual cart with a buyer profile corresponding to the buyer identifying information.

8. The method as recited in claim 7, further comprising sending the buyer identifying information to at least one of:
a site computing device associated with the first merchant site; or
the service computing device.

9. The method as recited in claim 5, further comprising receiving an order confirmation from at least one of a first computing device associated with the first merchant site or a second computing device associated with the second merchant site.

10. The method as recited in claim 5, wherein presenting the third GUI including the representation of items associated with the persistent virtual cart further comprises presenting in the third GUI a virtual control to enable a delivery gratuity to be specified for at least one of the first item or the second item.

11. The method as recited in claim 5, further comprising, prior to the sending the instruction, receiving, via the third GUI, an input to modify an attribute or a quantity of the first item.

12. The method as recited in claim 5, further comprising presenting, in the first GUI, the first virtual control for adding the first item to the persistent virtual cart and an additional virtual control selectable to cause presentation of the third GUI to view contents of the persistent virtual cart.

13. One or more non-transitory computer-readable media maintaining instructions that, when executed by one or more processors, program the one or more processors to:
receive, from an application on a first computing device associated with a buyer, a request for information related to an item offered by a merchant site;
send, to the first computing device, the information related to the item and information for presenting a virtual control to enable the item to be associated with a persistent virtual cart maintained by a second computing device associated with a service provider;
receive, from the computing device, an instruction to send the information related to the item to the second computing device for association with the persistent virtual cart; and
sending the information related to the item to the second computing device with an instruction to associate the information related to the item with the persistent virtual cart maintained by the second computing device; and
presenting, on a display of the first computing device, an interface that includes a representation of content of the persistent virtual cart including the item and modifiable options corresponding to delivery pick up of the item, the modifiable options allowing modification, prior to purchasing the item, to at least one of the delivery or pick up of the item.

14. The one or more non-transitory computer-readable media as recited in claim 13, wherein the instructions program the one or more processors to:
in response to receiving the instruction from the first computing device, send, to the computing device, a request for buyer identifying information; and
receive the buyer identifying information from the computing device.

15. The one or more non-transitory computer-readable media as recited in claim 14, wherein the instructions program the one or more processors to send the buyer identifying information to the second computing device in association with the instruction to associate the information related to the item with the persistent virtual cart.

16. The one or more non-transitory computer-readable media as recited in claim 14, wherein the instructions program the one or more processors to receive the buyer identifying information as buyer login information including one or more buyer credentials associated with a buyer profile corresponding to the persistent virtual cart maintained by the second computing device.

17. The one or more non-transitory computer-readable media as recited in claim 13, wherein the instructions program the one or more processors to receive the buyer identifying information, at least in part from a cookie maintained at the first computing device.

18. The one or more non-transitory computer-readable media as recited in claim 13, wherein the instructions program the one or more processors to:
   receive, from the second computing device, a request to order the item on behalf of the buyer; and
   send an order confirmation to at least one of the second computing device or the first computing device.

19. The one or more non-transitory computer-readable media as recited in claim 18, wherein the instructions program the one or more processors to send, to a third computing device at a point-of-sale location, information related to the request to order the item and at least one of a requested pickup time or a requested delivery time.

* * * * *

UNITED STATES PATENT AND TRADEMARK OFFICE
CERTIFICATE OF CORRECTION

| | | |
|---|---|---|
| PATENT NO. | : 10,055,779 B1 | Page 1 of 1 |
| APPLICATION NO. | : 14/501285 | |
| DATED | : August 21, 2018 | |
| INVENTOR(S) | : Ajit Kalidindi Varma | |

It is certified that error appears in the above-identified patent and that said Letters Patent is hereby corrected as shown below:

In the Claims

In Claim 1, Column 31, Line 4, please replace "the service provider" with "a service provider."

In Claim 5, Column 31, Line 40, please replace "via the second GUI" with "via a second GUI."

In Claim 5, Column 31, Lines 40-41, please replace "the second virtual control" with "a second virtual control."

In Claim 13, Column 32, Line 41, please replace "from the computing device" with "from the first computing device."

In Claim 13, Column 32, Line 53, please replace "delivery pick up" with "delivery and pick up."

In Claim 14, Column 32, Line 61, please replace "the computing device" with "the first computing device."

In Claim 14, Column 32, Line 63-64, please replace "the computing device" with "the first computing device."

In Claim 17, Column 33, Line 12, please replace "claim 13" with "claim 14."

Signed and Sealed this
Thirteenth Day of November, 2018

Andrei Iancu
*Director of the United States Patent and Trademark Office*